United States Patent
Hansen

(10) Patent No.: US 12,317,776 B2
(45) Date of Patent: Jun. 3, 2025

(54) HARVESTING MACHINE HAULAGE VEHICLE COORDINATION CONTROL

(71) Applicant: Deere & Company, Moline, IL (US)

(72) Inventor: Matthew D. Hansen, Bondurant, IA (US)

(73) Assignee: Deere & Company, Moline, IL (US)

( * ) Notice: Subject to any disclaimer, the term of this patent is extended or adjusted under 35 U.S.C. 154(b) by 798 days.

(21) Appl. No.: 17/522,345

(22) Filed: Nov. 9, 2021

(65) Prior Publication Data

US 2023/0143718 A1    May 11, 2023

(51) Int. Cl.
| | | |
|---|---|---|
| *A01D 41/127* | (2006.01) | |
| *A01D 41/12* | (2006.01) | |
| *G05D 1/692* | (2024.01) | |

(52) U.S. Cl.
CPC ..... *A01D 41/1278* (2013.01); *A01D 41/1217* (2013.01); *G05D 1/692* (2024.01)

(58) Field of Classification Search
CPC . A01D 41/1278; A01D 41/1217; G05D 1/692
See application file for complete search history.

(56) References Cited

U.S. PATENT DOCUMENTS

| | | | |
|---|---|---|---|
| 8,437,901 B2 | 5/2013 | Anderson | |
| 8,738,238 B2 | 5/2014 | Rekow | |
| 11,787,445 B2* | 10/2023 | Rands | B60W 60/00272 |
| | | | 701/23 |
| 2011/0112730 A1* | 5/2011 | Rekow | G05D 1/0291 |
| | | | 701/50 |
| 2012/0215381 A1* | 8/2012 | Wang | A01B 69/008 |
| | | | 701/1 |

(Continued)

FOREIGN PATENT DOCUMENTS

| | | |
|---|---|---|
| DE | 102020100299 A1 | 7/2021 |
| WO | WO 2011059932 A1 | 5/2011 |
| WO | WO 2012110545 A1 | 8/2012 |

OTHER PUBLICATIONS

Hao et al., Differential Flatness-Based Formation Following of a Simulated Autonomous Small Grain Harvesting System, Apr. 2004, Transactions of the ASAE, pp. 1-10 (Year: 2004).*

(Continued)

*Primary Examiner* — Sze-Hon Kong
(74) *Attorney, Agent, or Firm* — Christopher J. Volkmann; Kelly, Holt & Christenson PLLC

(57) ABSTRACT

An agricultural harvesting machine includes a harvested crop repository and a crop processing system configured to engage crop in a field, perform a crop processing operation on the crop, and move the processed crop to the harvested crop repository, the crop processing system including a transfer mechanism configured to transfer the processed crop to a support machine. The agricultural harvesting machine includes a control system configured to identify a turn to be performed by the agricultural harvesting machine in the field, determine a harvesting machine turn path for the agricultural harvesting machine to perform the turn on the field, generate a support machine turn path based on the harvesting machine turn path, and communicate an indication of the support machine turn path to a communication device associated with the support machine.

20 Claims, 21 Drawing Sheets

(56) References Cited

U.S. PATENT DOCUMENTS

| | | | | |
|---|---|---|---|---|
| 2012/0215394 | A1* | 8/2012 | Wang | A01B 69/008 |
| | | | | 701/50 |
| 2013/0211658 | A1* | 8/2013 | Bonefas | A01D 43/087 |
| | | | | 701/28 |
| 2013/0231823 | A1* | 9/2013 | Wang | A01D 43/086 |
| | | | | 701/32.4 |
| 2014/0047810 | A1* | 2/2014 | Peters | A01D 75/00 |
| | | | | 56/10.1 |
| 2015/0264866 | A1* | 9/2015 | Foster | B65G 67/04 |
| | | | | 414/21 |
| 2017/0060134 | A1* | 3/2017 | Buhler | A01B 69/008 |
| 2017/0147005 | A1* | 5/2017 | Ramm | G05D 1/0295 |
| 2018/0024549 | A1* | 1/2018 | Hurd | G05D 1/0016 |
| | | | | 701/2 |
| 2020/0319632 | A1* | 10/2020 | Desai | A01B 69/008 |
| 2020/0319655 | A1* | 10/2020 | Desai | G05D 1/0291 |
| 2020/0331347 | A1* | 10/2020 | Sakaguchi | A01D 41/1275 |
| 2021/0026362 | A1* | 1/2021 | Wilson | B60K 35/22 |
| 2021/0354754 | A1* | 11/2021 | Van Poucke | B62D 15/023 |
| 2022/0204051 | A1* | 6/2022 | Rands | B60W 60/00274 |
| 2023/0329148 | A1* | 10/2023 | Meier | A01D 41/1272 |

OTHER PUBLICATIONS

Tian et al., Smart Autonomous Grain Carts for Harvesting-on-Demand, Sep. 24-28, 2017, IEEE/RSJ International Conference on Intelligent Robots and Systems, pp. 5168-5173 (Year: 2017).*

Shangguan et al., Motion Planning for Autonomous Grain Carts, Mar. 2021, IEEE Transactions on Vehicular Technology, vol. 70, No. 3, pp. 2112-2123 (Year: 2021).*

German Search Report issued in application No. DE 102022210223.1 dated Jun. 5, 2023 (10 pages).

* cited by examiner

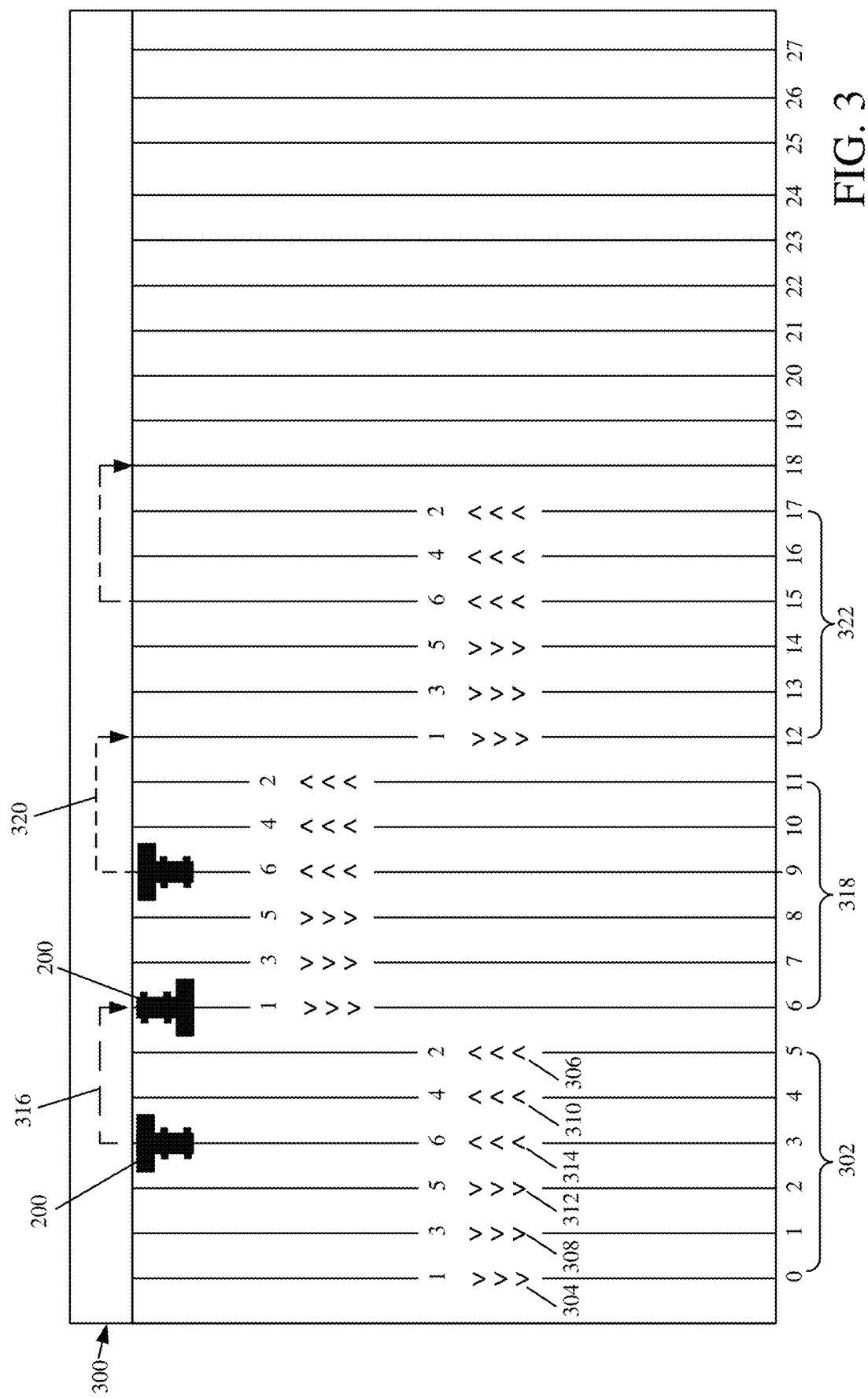

HARVESTING MACHINE HAULAGE VEHICLE COORDINATION CONTROL

FIELD OF THE DESCRIPTION

The present description generally relates to agricultural harvesting machines. More specifically, but not by limitation, the present description relates to a harvesting machine control system configured to coordinate operation with a haulage vehicle or other support machine.

BACKGROUND

There are many different types of mobile machines. There are also many different types of mobile machines that have local material storage repositories that store material that is gathered, or that is distributed, by the machine.

For instance, in one example, an agricultural harvester harvests material, such as grain. In harvesting grain, the harvester processes the grain and stores the grain in a clean grain tank. When the clean grain tank is full, or nearing full capacity, the combine harvester unloads the clean grain into a haulage vehicle or unit, which may be a grain cart pulled by a tractor. The haulage unit then often transports the harvested grain to another vehicle, such as a semi-truck for transport to a different location.

Other examples of mobile work machines that collect material include machines such as a sugarcane harvester, a forage harvester, a baler, a timber harvester, an asphalt milling machine, a scraper, among a wide variety of other machines.

The discussion above is merely provided for general background information and is not intended to be used as an aid in determining the scope of the claimed subject matter.

SUMMARY

An agricultural harvesting machine includes a harvested crop repository and a crop processing system configured to engage crop in a field, perform a crop processing operation on the crop, and move the processed crop to the harvested crop repository. The crop processing system includes a transfer mechanism configured to transfer the processed crop to a support machine. The agricultural harvesting machine includes a control system configured to identify a turn to be performed by the agricultural harvesting machine in the field, determine a harvesting machine turn path for the agricultural harvesting machine to perform the turn on the field, generate a support machine turn path based on the harvesting machine turn path, and communicate an indication of the support machine turn path to a communication device associated with the support machine.

Example 1 is an agricultural harvesting machine comprising:
  a harvested crop repository;
  a crop processing system configured to engage crop in a field, perform a crop processing operation on the crop, and move the processed crop to the harvested crop repository, the crop processing system including a transfer mechanism configured to transfer the processed crop to a support machine; and
  a control system configured to:
    identify a turn to be performed by the agricultural harvesting machine in the field;
    determine a harvesting machine turn path for the agricultural harvesting machine to perform the turn on the field;
    generate a support machine turn path based on the harvesting machine turn path; and
    communicate an indication of the support machine turn path to a communication device associated with the support machine.

Example 2 is the agricultural harvesting machine of any or all previous examples, wherein the control system is configured to:
  determine that the turn has a turning rate above a threshold; and
  generate the support machine turn path based on the determination.

Example 3 is the agricultural harvesting machine of any or all previous examples, wherein the control system is configured to:
  identify a set of guidance lines representing passes on the field based on a machine path definition; and
  identify the turn between a set of the passes.

Example 4 is the agricultural harvesting machine of any or all previous examples, wherein the control system is configured to:
  generate operational instructions for the support machine in a real-time coordination mode;
  deactivate the real-time coordination mode based on the determination that the turn has a turning rate above the threshold;
  detect completion of the turn; and
  reactivate the real-time coordination mode based on the detected completion of the turn.

Example 5 is the agricultural harvesting machine of any or all previous examples, wherein the turn comprises a turn between successive passes over the field.

Example 6 is the agricultural harvesting machine of any or all previous examples, wherein the support machine is configured to perform automated steering control based on the indication of the support machine turn path.

Example 7 is the agricultural harvesting machine of any or all previous examples, wherein the control system is configured to:
  operate the transfer mechanism to transfer the processed crop to the support machine during execution of the turn.

Example 8 is the agricultural harvesting machine of any or all previous examples, wherein the control system is configured to:
  identify a path offset; and
  generate the support machine turn path based on the harvesting machine turn path and the offset.

Example 9 is the agricultural harvesting machine of any or all previous examples, wherein the control system is configured to:
  identify a curvature of a portion of harvesting machine turn path; and
  generate the support machine turn path that corresponds to the curvature and has a distance from the harvesting machine turn path based on the offset.

Example 10 is a method performed by an agricultural harvesting machine, the method comprising:
  controlling a crop processing system to engage crop in a field, perform a crop processing operation on the crop, and move the processed crop to a harvested crop repository;
  identifying a turn to be performed by the agricultural harvesting machine in the field;
  determining a harvesting machine turn path for the agricultural harvesting machine to perform the turn on the field;

generating a support machine turn path based on the harvesting machine turn path; and
communicating an indication of the support machine turn path to a communication device associated with the support machine.

Example 11 is the method of any or all previous examples, and further comprising:
determining that the turn has a turning rate above a threshold; and
generating the support machine turn path based on the determination.

Example 12 is the method of any or all previous examples, and further comprising:
generating operational instructions for the support machine in a real-time coordination mode;
deactivating the real-time coordination mode based on the determination that the turn has a turning rate above the threshold;
detecting completion of the turn; and
reactivating the real-time coordination mode based on the detected completion of the turn.

Example 13 is the method of any or all previous examples, and further comprising:
operating the transfer mechanism to transfer the processed crop to the support machine during execution of the turn.

Example 14 is the method of any or all previous examples, and further comprising:
identifying a path offset; and
generating the support machine turn path based on the harvesting machine turn path and the offset.

Example 15 is the method of any or all previous examples, and further comprising:
identifying a curvature of a portion of harvesting machine turn path; and
generating the support machine turn path that corresponds to the curvature and has a distance from the harvesting machine turn path based on the offset.

Example 16 is a control system for an agricultural harvesting machine, the control system comprising:
at least one processor; and
memory storing instructions executable by the at least one processor, wherein the instructions, when executed, provide:
an automated machine coordination component configured to:
communicate with a support machine configured to receive harvested crop from the agricultural harvesting machine; and
send a control instruction to the support machine to coordinate operation of the support machine with the agricultural harvesting machine;
a turn automation component configured to:
receive a machine path definition;
control the agricultural harvesting machine to traverse a plurality of turns in the field based on the machine path definition; and
identify a particular turn having a turning rate above a threshold;
an unloading mode selection configured to select an unloading mode corresponding to the particular turn based on a selection criterion; and
a control signal generator configured to generate a control signal to control operation of the agricultural harvesting machine based on the selected unloading mode.

Example 17 is the control system of any or all previous examples, wherein the selection criterion comprises one or more of:
a connection status of a communication channel between the agricultural harvesting machine and the support machine;
an unloading status of a transfer mechanism that transfers harvested crop from the agricultural harvesting machine to the support machine; and
a user preference setting indicating unloading mode prioritization.

Example 18 is the control system of any or all previous examples, wherein the unloading mode comprises at least one of:
a stop and finish mode that prioritizes unloading prior to the turn;
an unloading cutoff mode that prioritizes turn traversal;
a turn sharing mode that generates and communicates an indication of a support machine turn path to the support machine; or
a delayed machine coordination that delays implementation of a real-time coordination control mode until after traversal of the turn.

Example 19 is the control system of any or all previous examples, wherein the unloading mode configures the control system to:
determine a harvesting machine turn path for the agricultural harvesting machine to perform the turn on the field;
generate a support machine turn path based on the harvesting machine turn path; and
communicate an indication of the support machine turn path to a communication device associated with the support machine.

Example 20 is the control system of any or all previous examples, wherein the control signal controls a communication system to send an indication of the selected unloading mode to the support machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 illustrates one example of an agricultural harvesting machine harvesting lands in a field in accordance with a machine path definition.

DETAILED DESCRIPTION

The present description generally relates to agricultural harvesting machines that include crop processing functionality, such as a header that engages a crop (grain, corn, etc.) from a field, and moves the processed crop to a harvested crop repository. An example harvesting machine includes a transfer mechanism configured to transfer the harvested crop from the repository to a support vehicle, such as a grain cart or other haulage vehicle. In some harvesting machine operations, unloading can occur when the machines are stationary or while the machines are moving across the field. Thus, the harvesting machine can simultaneously harvest crop from the field while unloading the process crop into a haulage vehicle. The present description proceeds with respect to a harvesting machine control system configured to coordinate operation of the harvesting machine with a haulage vehicle or other support machine.

Similar types of operations can be performed with work other machines that collect material, such as other harvesters, asphalt milling machines, scrapers, etc. Similar types of operations can also be performed with respect to machines that distribute material, such as fertilizer or chemical application equipment.

Figure 1:
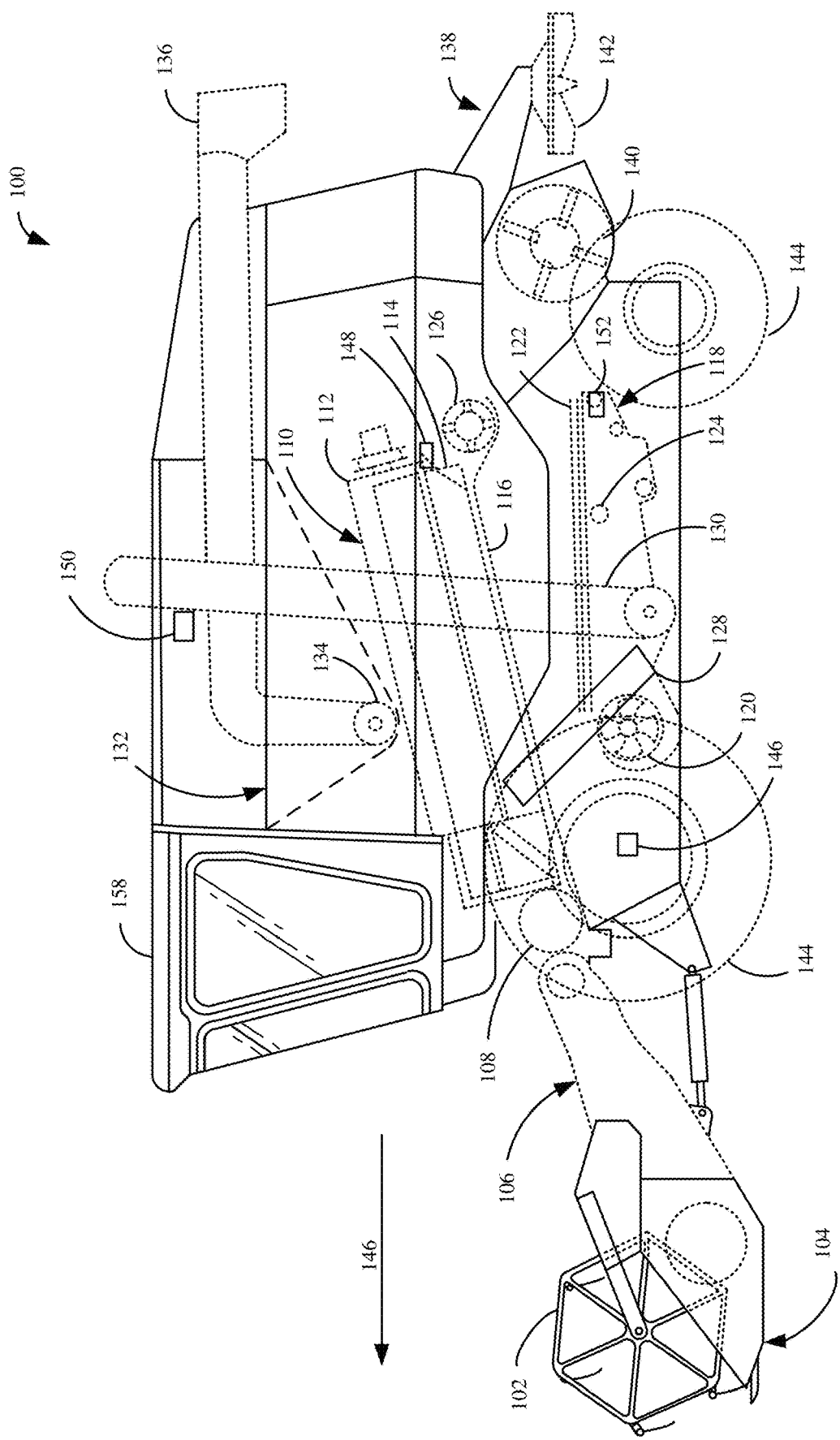
FIG. 1 is a partial pictorial, partial schematic view of one example of an agricultural harvesting machine.

FIG. 1 is a partial pictorial, partial schematic, illustration of an agricultural machine 100, in an example where machine 100 is a combine harvester (also referred to as harvester or combine 100). It can be seen in FIG. 1 that machine 100 illustratively includes an operator compartment 101, which can have a variety of different operator interface mechanisms, for controlling machine 100. Machine 100 can include a set of front end equipment that can include header 102, and a cutter generally indicated at 104. Machine 100 can also include a feeder house 106, a feed accelerator 108, and a thresher generally indicated at 110. Thresher 110 illustratively includes a threshing rotor 112 and a set of concaves 114. Further, machine 100 can include a separator 116 that includes a separator rotor. Machine 100 can include a cleaning subsystem (or cleaning shoe) 118 that, itself, can include a cleaning fan 120, chaffer 122 and sieve 124. The material handling subsystem in machine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Machine 100 can further include a residue subsystem 138 that can include chopper 140 and spreader 142. Machine 100 can also have a propulsion subsystem that includes an engine that drives ground engaging wheels 144 or tracks, etc. It will be noted that machine 100 may also have more than one of any of the subsystems mentioned above (such as left and right cleaning shoes, separators, etc.).

In operation, and by way of overview, machine 100 illustratively moves through a field in the direction indicated by arrow 146. As machine 100 moves, header 102 engages the crop to be harvested and gathers the crop toward cutter 104. After the crop is cut, the crop is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. The residue can be chopped by residue chopper 140 and spread on the field by spreader 142. In other configurations, the residue is simply chopped and dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits the clean grain in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in machine 100 toward the residue subsystem 138.

Tailings can be moved by tailings elevator 128 back to thresher 110 where the tailings can be re-threshed. Alternatively, the tailings can also be passed to a separate re-threshing mechanism (also using a tailings elevator or another transport mechanism) where the tailings can be re-threshed as well.

FIG. 1 also shows that, in one example, machine 100 can include ground speed sensor 147, one or more separator loss sensors 148, a clean grain camera 150, and one or more cleaning shoe loss sensors 152. Ground speed sensor 147 illustratively senses the travel speed of machine 100 over the ground. Travel speed sensing can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. Loss detection can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on machine 100 as well. For instance, sensors can include a residue setting sensor that is configured to sense whether machine 100 is configured to chop the residue, drop a windrow, etc. The sensors can include cleaning shoe fan speed sensors that can be configured proximate fan 120 to sense the speed of the fan. The sensors can include a threshing clearance sensor that senses clearance between the rotor 112 and concaves 114. The sensors can include a threshing rotor speed sensor that senses a rotor speed of rotor 112. The sensors can include a chaffer clearance sensor that senses the size of openings in chaffer 122. The sensors can include a sieve clearance sensor that senses the size of openings in sieve 124. The sensors can include a material other than grain (MOG) moisture sensor that can be configured to sense the moisture level of the material other than grain that is passing through machine 100. The sensors can include machine setting sensors that are configured to sense the various configurable settings on machine 100. The sensors can also include a machine orientation sensor that can be any of a wide variety of different types of sensors that sense the orientation of machine 100. Crop property sensors can sense a variety of different types of crop properties, such as crop type, crop moisture, and other crop properties. The sensors can also be configured to sense characteristics of the crop as the crop is being processed by machine 100. For instance, the sensors can sense grain feed rate, as the grain travels through clean grain elevator 130. The sensors can sense mass flow rate of grain through elevator 130, or provide other output signals indicative of other sensed variables. Some additional examples of the types of sensors that can be used are described below.

Figure 2:
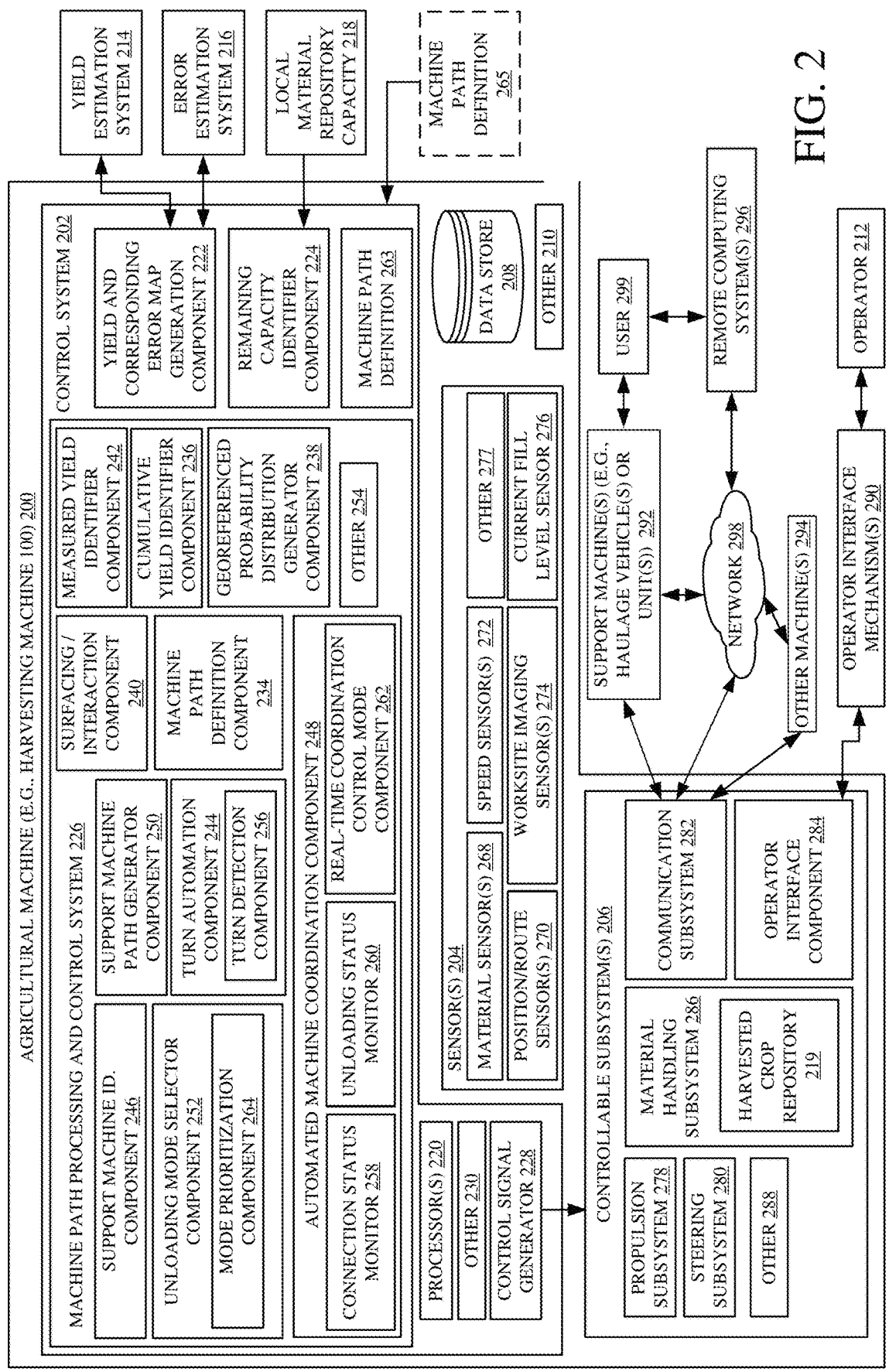
FIG. 2 is a block diagram showing one example an agricultural harvesting machine.

FIG. 2 is a block diagram showing one example of an agricultural machine 200. Some examples of agricultural machine 200 include, but are not limited to, a tilling machine, a planting machine, a product application (e.g., spraying) machine, a harvesting machine (also referred to as a "harvester" or "combine"), and a windrower, to name a few. For instance, machine 200 can include combine 100 illustrated in FIG. 1. For sake of discussion, but not by limitation, some examples will be described below in the context of a harvesting operation, and machine 200 will also be referred to as harvesting machine 200.

Machine 200 includes a control system 202, one or more sensors 204, and one or more controllable subsystems 206. Machine 200 can also include a data store 208, and can include one or more other items 210. In an example, control system 202 can be configured to operate machine 200 in autonomous or semi-autonomous modes, e.g., in which an operator 212 is on-board or nearby to perform one or more functions. These functions may include, for example without limitation, one or more of guidance, safeguarding, diagnosis, task monitoring, task control, or data recording.

Control system 202 can receive input from a yield estimation system 214 and an error estimation system 216. Control system 202 can also receive a capacity indicator 218 indicating the capacity of a local harvested crop repository 219 (e.g., clean grain tank 132) on machine 200. It will be appreciated that systems 214 and 216, and capacity indicator 218, can all be on machine 200. The items are shown separately for the sake of example only.

In the example of FIG. 2, control system 202 includes one or more processor(s) 220, a yield and corresponding error map generation component 222, a remaining capacity identifier component 224, a machine path processing and control system 226 (also referred to as path processing system 226), and a control signal generator 228. Control system 202 can include other items 230 as well.

Path processing system 226 illustratively includes a machine path definition component 234, a cumulative yield identifier component 236, a georeferenced probability distribution generator component 238, a surfacing/interaction component 240, and a measured yield identifier component 242. System 226 also includes a turn automation component 244, a support machine (e.g., haulage vehicle) identification component 246, an automated machine coordination component 248, a support machine path generator component 250, and an unloading mode selector component 252. System 226 can include other items 254 as well.

Turn automation component 244 includes a turn detection component 256, and can include other items as well. Automated machine coordination component 248 includes a connection status monitor 258, an unloading status monitor 260, and a real-time coordination control mode component 263, and can include other items as well. Unloading mode selector component 252 includes a mode prioritization component 264, and can include other items as well.

Sensors 204 include material sensors 268, position/route sensors 270, speed sensors 272, worksite imaging sensors 274, a current fill level sensor 276, and can include other sensors 277 as well.

Material sensors 268 are configured to sense material being moved, processed, or otherwise worked on by machine 200. For example, material sensors 268 include yield sensors. Position/route sensors 270 are configured to identify a position of machine 200 and/or a corresponding route (e.g., heading) of machine 200 as machine 200 traverses the field. A position sensor can be any of a wide variety of different types of position sensors such as a global positioning system (GPS) receiver, a dead reckoning system, or a wide variety of other systems that provide an indication of a current geographic location of harvesting machine 200. The systems can provide orientation, ground speed and other information as well. Speed sensors 272 are configured to output a signal indicative of a speed of machine 200. Worksite imaging sensors 274 are configured to obtain images of the field, which can be processed, for example to identify conditions of the field. Examples of conditions include, but are not limited to, terrain topology, terrain roughness, terrain soil conditions, obstacles that inhibit operation of machine 200, etc. In an example agricultural harvester, signals from worksite imaging sensors 274 can be used to identify crop characteristics, such as an expected yield, whether the crop being harvested is "downed", etc.

Current fill level sensor 276 illustratively senses a fill level in the local material repository (e.g., the clean grain tank) on harvesting machine 200. Sensor 276 can be any of a wide variety of different level sensors, such as an optical sensor, a weight or mass sensor, a mass flow sensor that measures the amount of material entering clean grain tank 132 since tank 132 was last emptied, etc.

Controllable subsystems 206 can include a propulsion subsystem 278, a steering subsystem 280, a communication subsystem 282, an operator interface component 284, and a material handling subsystem 286. Examples of subsystem 286 includes a threshing subsystem, a cleaning subsystem, and a residue subsystem, such as those discussed above with respect to FIG. 1. The harvested crop is stored in harvested crop repository 219. Subsystems 206 can include other items 288 as well.

Control signal generator 228 can generate control signals to control operator interface component 284. The operator interface component 284 can control operator interface mechanisms 290, and receive operator interactions through mechanisms 290. Operator interface mechanisms 290 may include such things as a steering wheel, joystick, levers, pedals, linkages, buttons, switches, and other such mechanisms. Mechanisms 290 can also include such things as a touch sensitive display screen so that user input mechanisms can be displayed, and actuated by operator 212, using touch gestures. Mechanisms 290 can include a microphone and corresponding speech recognition system, as well as a speaker and corresponding speech synthesis system. Operator interface mechanisms 290 can include a wide variety of other mechanical, electromechanical, visual, audio or haptic systems as well. These, of course, are for sake of example only.

Control signal generator 228 can also control communication subsystem 282 to communicate with other systems or machines. For example, communication subsystem 282 can communicate with one or more support machine (e.g., haulage vehicles or units) 292, other machines 294, and remote computing system(s) 296, either directly or over a network 298. For sake of illustration, but not by limitation, support machine 292 will also be referred to as haulage vehicle 292.

Network 298 can be any of a wide variety of different types of networks. For instance, network 298 can be a wide area network, a local area network, a near field communication network, a cellular communication network, or any of a wide variety of other networks, or combinations of networks. Machines 294 can include other machines operating in the field along with machine 200. Machines 294 can be of a same type, or different type, as machine 200.

Communication subsystem 282 can include wired and/or wireless communication components, which can be substantially any communication system that can be used by the systems and components of machine 200 to communicate information to other items, such as between control system 202, sensors 204, and controllable subsystems 206. In one example, communication subsystem 282 communicates over a controller area network (CAN) bus (or another network, such as an Ethernet network, etc.) to communicate information between those items. This information can include the various sensor signals and output signals generated by the sensor variables and/or sensed variables.

A remote user 299 is illustrated as interacting with remote computing system 296, such as to receive communications from or send communications to machine 200 through communication subsystem 282. For example, but not by limitation, remote user 299 can receive communications, such as notifications, requests for assistance, etc., machine 200 on a mobile device.

Before describing the operation of harvesting machine 200 in more detail, a brief description of some of the items illustrated in FIG. 2, and their operation, will first be provided.

Yield estimation system 214 illustratively generates an estimate of yield at different geographic locations in the field being harvested by machine 200. The yield estimation system 214 can take a wide variety of different forms and illustratively provides a georeferenced prior estimate of yield. Briefly, by prior, it is meant that the data is formed or obtained beforehand, prior to the operation by machine 200.

The estimating techniques can include a wide variety of different techniques such as in-season remote sensing, sampling ears from individual plants and extrapolating results across the field, and crop modeling. Yield estimation system 214 may include near real time sensing which may include, for instance, on-board image capture devices (which capture images ahead of machine 200, or to the sides of machine 200) and corresponding image processing logic that processes the images to identify an estimated yield. The on-board system may include other types of perception systems as well, such as LIDAR, stereo cameras, etc. In another example, yield estimation system 214 can include a system that receives aerial images that are processed to generate normalized different vegetative index (NDVI) or leaf area index (LAI) at a particular growth stage, and uses one or more of those indices to estimate harvested yield. Yield estimation system 214 can also include real time yield sensors, which sense the current yield (such as the mass flow rate of grain through machine 200, or other sensors indicative of yield) and correct the forward-looking yield estimates in the field, and particularly in the path over which machine 200 is traveling. These and other types of yield estimation systems are contemplated herein.

Error estimation system 216 illustratively estimates an error corresponding to the yield estimate generated by system 214. Capacity indicator 218 can include a value that is stored on harvesting machine 200, itself. The value is illustratively indicative of the overall capacity of the clean grain tank on machine 200. Capacity indicator 218 can also include a value that is stored at a remote location, and accessed by communication subsystem 282 when harvesting machine 200 starts, or is about to start, operation.

Yield and corresponding error map generation component 222 illustratively generates a georeferenced yield estimate, along with a georeferenced error estimate. The georeferenced yield estimate is illustratively a georeferenced predicted yield map for at least a portion of the field over which machine 200 is traveling, along with an error estimate corresponding to the georeferenced predicted yield. In one example, the georeferenced yield and corresponding error map is generated with a resolution that corresponds to segments along a travel path of harvesting machine 200. The yield and corresponding error map are output by component 222 to path processing system 226.

Remaining capacity identifier component 224 illustratively generates a value indicative of a remaining capacity in the local material repository (e.g., the clean grain tank 132) on harvesting machine 200. The remaining capacity value is illustratively updated as machine 200 continues to operate, performing the harvesting operation and filling repository 219.

Machine path definition component 234 is configured to define or otherwise obtain a machine path definition 263. Machine path definition 263 can be obtained in any of a number of ways. For example, machine path definition 263 can be received by machine 200, as represented at block 265.

Machine path definition 263 can be generated by another machine or system, such as system 296, and transmitted to machine 200. Alternatively, or in addition, machine path definition 263 can be generated by component 234 based on input from operator 212 through mechanisms 290.

Machine path definition 263 provides a pre-defined machine path for operation of machine 200 on the target field. Machine path definition 263 can be utilized by control system 202 to automatically navigate machine 200 along the predefined machine path. For instance, when harvesting corn, a combine harvester often has an unload auger that is only positionable over one side of the combine harvester. Therefore, in order to perform unloading while harvesting, the combine harvester must be controlled so that the unloading auger is always over an already-harvested portion of the machine (except, perhaps, during an initial pass opening up a field or a land). Such control can ensure that a grain cart can always operate next to the combine harvester without running over crop.

In one example, machine path definition 263 defines a navigation path for machine 200 through "lands", or sections of the field made up of some number of passes. The navigation path is predefined, in that the path of machine 200 is defined prior to the current operation.

For sake of illustration, but not by limitation, FIG. 3 illustrates an example machine path definition for machine 200 on a field 300, that includes twenty-eight passes (labeled passes 0-27) to be completed by machine 200. Machine 200 is shown harvesting a first land 302, which includes passes 0-5, in a "spiral-in" pattern so that the first navigation pass through land 302 is along navigation path 0 in the direction indicated by arrows 304. The second pass through land 302 is along navigation path 5 in the direction indicated by arrows 306. The third pass through land 302 is along navigation path 1 in the direction indicated by arrows 308. The fourth pass through land 302 is along navigation path 4 in the direction indicated by arrow 310, fifth pass through land 302 is along navigation path 2 in the direction indicated by arrows 312, and the sixth pass through land 302 is along navigation path 3 in the direction indicated by arrows 314. Thus, in this example, the machine path definition includes a land size of six passes, a spiral-in turn pattern, and a left turn direction.

Alternatively, an example "spiral-out" pattern for machine 200 in land 302 includes a first pass along navigation path 2, a second pass along navigation path 3, a third pass along navigation path 1, a fourth pass along navigation path 4, a fifth pass along navigation path 0, and a sixth pass along navigation path 5.

After completing the six passes through land 302, machine 200 is navigated along a path 316 through already-harvested end rows to a different land 318 in field 300 beginning at path 6. Then, after completing land 318, machine 200 continues along path 320 to begin another land 322 along path 12.

Referring again to FIG. 2, machine path definition 263 includes a turn pattern (e.g., spiral-in or spiral-out) and/or a turn direction (e.g., left or right). Machine path definition 263 also includes a land size in the field (e.g., a number of passes to be made with the turn pattern before moving on to the next land or section in the field).

Control system 202 is configured to determine whether the current land that machine 200 is operating on will be completed after the present pass. If not, control system 202 then identifies the next pass through the field. To determine whether the land is completed, control system 202 can detect the number of paths that have been skipped in a spiral-in pattern to determine the number of paths that are left to harvest. Control system 202 can identify the number of paths skipped in a spiral-out pattern, and compare that to the land size, to determine whether the land size has been completed.

Once control system 202 detects that the land will be completed after the current pass, control system 202 identifies a next land that the machine 200 should proceed to, within the field. Control system 202 can detect when the field is completed so that a next land need not be harvested.

When conducting a spiral-out pattern, for instance, machine 200 does not skip any unharvested paths but instead proceeds to the next unharvested path and harvests the next unharvest path. When conducting a spiral-in pattern, the number of paths will include the land size (in terms of the number of paths) less one.

Cumulative yield identifier component 236 identifies the cumulative yield that machine 200 will encounter, as machine 200 travels over the machine path. Georeferenced probability distribution generator component 238 generates a georeferenced probability distribution indicative of the probability that the repository 219 (e.g., the clean grain tank) will reach capacity at different geographic locations along the machine path.

Measured yield identifier component 242 measures the actual yield encountered by machine 200. The measured yield value can be fed back to yield estimation system 214 or error estimation system 216 in order to correct the yield estimate or the error estimate. These corrected values can then be used by component 222 to generate an updated yield and corresponding error map.

Machine path processing system 226 is configured to process path information for machines 200 and 292. Turn automation component 244 is configured to automate turns made by machine 200 between adjacent passes in the field. For instance, component 244 can receive or create guidance lines for the field, and then stitch together the guidance lines to create a set of turning directions or paths. The guidance lines can be defined by operator 212 and/or based on machine path definition 263.

Turn detection component 256 is configured to detect turns in the machine path, as well as characteristics (e.g., an inflection point, a radius, an expected rate of turn (i.e., degrees per second (deg/sec)), among other characteristics. In one example, the turns and corresponding turn characteristics are identified from machine path definition 263. It is noted that an identified turn can include, but is not limited to, a turn between successive passes (e.g., adjacent paths over the field), as well as changes in heading during a given path (e.g., the field has a curvature with non-linear passes).

Support machine identification component 246 is configured to identify one or more haulage vehicles (or other support machines) on or in the vicinity to the current field being operated upon by machine 200. Component 246 can also determine the current location of the haulage vehicle(s), for example based on location data received from the haulage vehicle(s).

Automated machine coordination component 248 is configured to facilitate coordinated operation of machines 200 and 292. For example, an operation mode for the support machine 292 is identified based on a mode priority defined or otherwise identified by component 264. This is discussed in further detail below. Briefly, however, an unloading mode can be selected by mode selector component 252 based on a mode priority that prioritized one or more of turn automation or support machine coordination. The selected unloading mode can be communicated to support machine 292. For example, support machine 292 can operate in a first mode in which support machine 292 is in a following position that follows machine 200 and a second mode in which support machine 292 is in an unloading position (e.g., to the side of machine 200) in which support machine 292 is configured to receive harvested crop from the harvested crop repository via a spout of machine 200. A mode transition control signal can be sent to support machine 292 to transition from the first mode to the second mode In one example, the coordination mode is based on a connection status between machines 200 and 292, as identified by connection status monitor 258. Alternatively, or in addition, the coordination mode can be based on the unloading status of machine 200 (e.g., whether machine 200 is currently unloading repository 219 into machine 292), as identified by unloading status monitor 258.

Figure 4A:
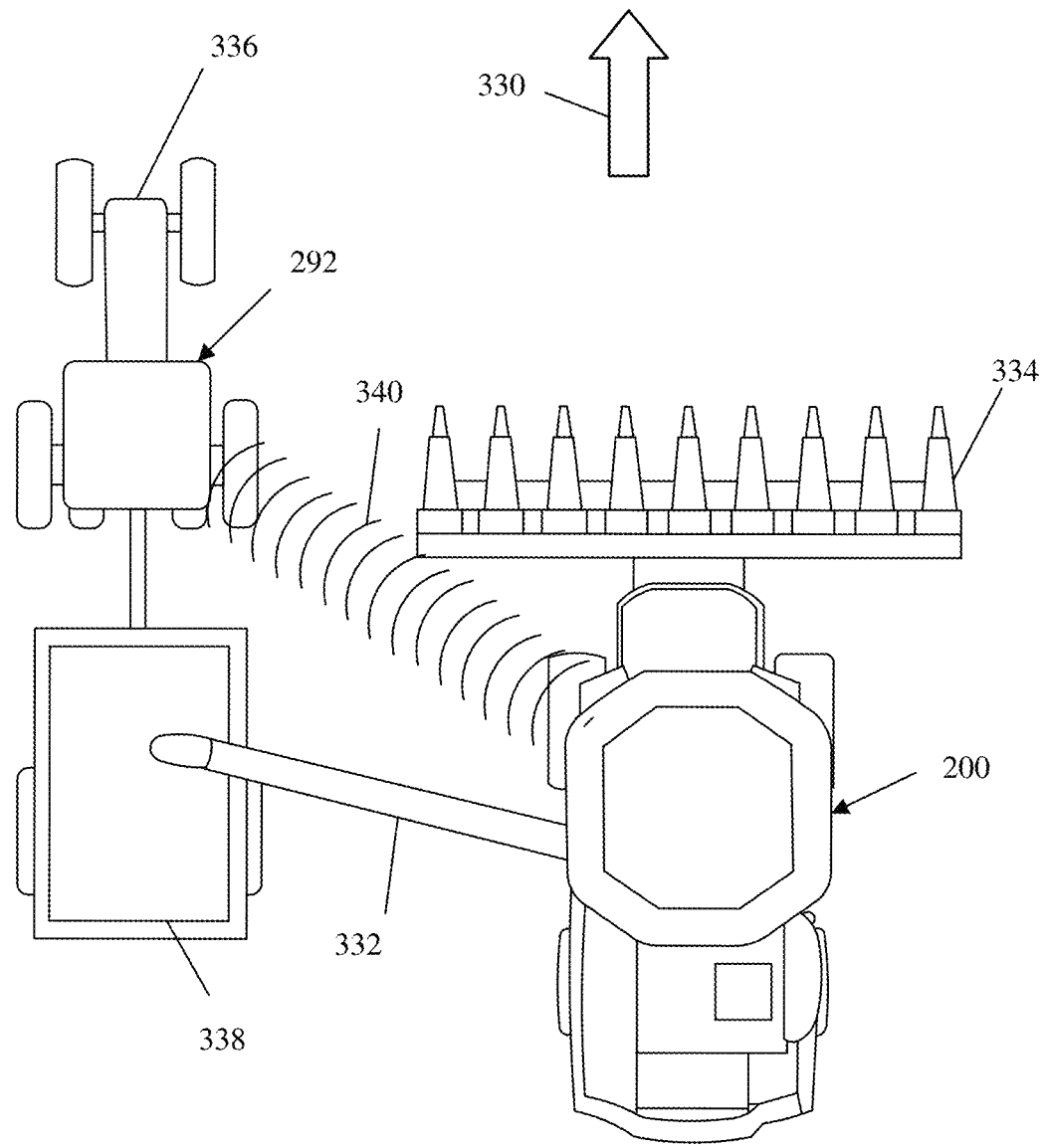
FIG. 4A illustrates one example of a support machine positioned in an unloading position relative to an agricultural harvesting machine.

Based on the mode selection, real-time coordination control mode component 262 can place machines 200 and 292 in a real-time coordination mode, which is configured to operate machine 292 in substantially real-time. By "real-time" coordination, it is meant that machines 200 and 292 have an active communication channel in which current operational aspects (e.g., location, speed, heading, distance, relative machine position, etc.) are being shared in one or more directions between machines 200 and 292. FIG. 4A illustrates one example of a real-time coordination mode.

As shown in FIG. 4A, support machine 292 (illustratively a haulage vehicle) is positioned next to agricultural harvesting machine 200 and travelling in the same direction of travel 330 such that a transfer mechanism 332 (e.g., a spout having an auger) of agricultural harvesting machine 200 can unload agricultural material into support machine 292. Collectively, agricultural harvesting machine 200 and support machine 292 can be considered an agricultural material transfer system. For purposes of explanation, agricultural harvesting machine 200 is shown as a combine with a harvesting head 334 and support machine 292 is shown as a tractor 336 and a storage portion 338 (illustratively a grain cart) towed by tractor 336. As agricultural harvesting machine 200 and support machine 292 move in direction 330, the machines maintain a relative state of alignment or coordination in order to achieve the transfer of the agricultural material from agricultural harvesting machine 200 to support machine 292. The heading and/or speed of agricultural harvesting machine 200 and support machine 292 may vary occasionally to generate changes in relative position in order to cause transfer mechanism to deposit the agricultural material into different locations of storage portion 338.

One of the ways that agricultural harvesting machine 200 and support machine 292 generate relative movement is by employing wireless communication. In one example, agricultural harvesting machine 200 and support machine 292 both utilize a wireless network (e.g., a radio-frequency (RF) network), indicated diagrammatically at reference numeral 340. Thus, when agricultural harvesting machine 200 needs to generate a change in relative position, machine 200 will issue such a command (termed a "nudge") to support machine 292 via network 340. Support machine 292 received the nudge and momentarily changes speed and/or heading in order to effect the relative position change. While it is possible to have agricultural harvesting machine 200 generate its own speed/heading change, in one example support machine 292 performs speed/heading changes.

One example of a wireless automated machine coordination system is sold under the trade designation Machine Sync, available from John Deere and Company of Moline, Illinois Machine Sync creates a wireless network between the support machine and the harvester to enable on-the-go unloading through synchronization of support machine speed and direction of travel with the harvester. Machine Sync facilitates: communication between operators of the harvester and the support machine; matching speeds between harvester and the support machine; awareness of upcoming waterways and field contour and agreement how to navigate; and awareness of equipment size and position. Further, Machine Sync guides an approaching grain cart tractor to a predetermined "Home" position for unloading. This is a unique home point for that specific grain cart tractor/combine. Individual home points allow combines, tractors, and grain carts to have different configurations (duals, cart sizes, and unloading auger lengths). While examples described herein are particularly suited for use in combination with Machine Sync, examples can be practiced with any suitable communication system or techniques can be used to communicate between the harvester and support machine.

Figure 4C:
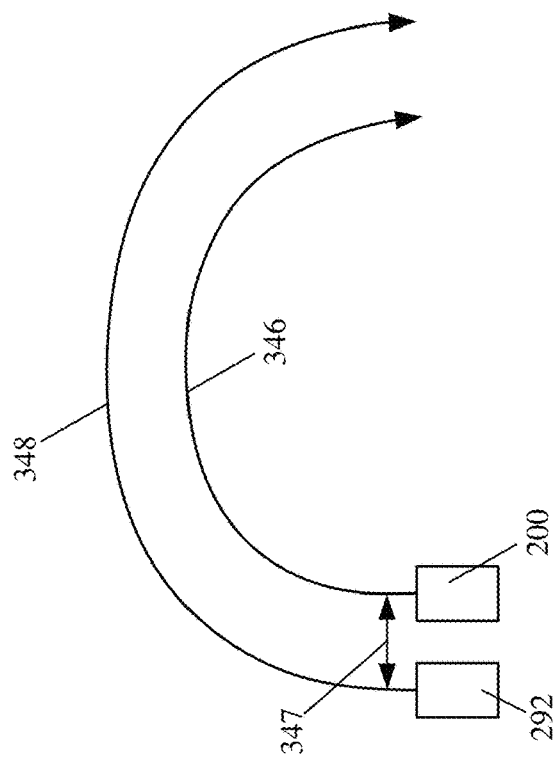
FIG. 4C is a schematic diagram illustrating one example operation of an agricultural machine and a support machine utilizing turn sharing.
Figure 4B:
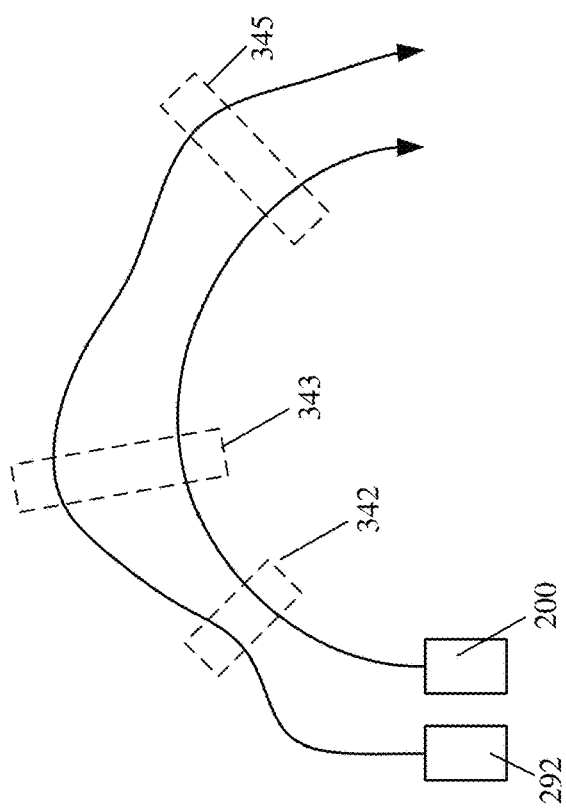
FIG. 4B is a schematic diagram illustrating one example operation of an agricultural machine and a support machine in which turn automation is utilized along with real-time coordination control.

FIG. 4B is a schematic diagram illustrating one example operation of machines 200 and 292 in which turn automation is utilized along with real-time coordination control. In such instances, inflection points in relatively sharp turns (i.e., turns having a turn rate above a threshold, such as ten degrees per second) can result in poor machine following performance of machine 292. For instance, at locations 342, 343, and 344, machine 292 can move out of alignment with the unloading spout of machine 200, resulting in spilled crop. In another instances, machine 292 can run into and physically contact machine 200, which can result in damage to the machine. Accordingly, turns are often unproductive, as the support machine is taking out of operation until after the harvesting machine has completed the turn. Further, this often requires manual operation of the support machine to reposition the support machine before beginning the next portion of the field after the turn.

As discussed in further detail below, support machine path generator component 250 is configured to generate path information that defines a path for support machine 292 to follow during relatively sharp turns. As such, real-time coordination control can be disengaged or suspended, or otherwise deactivated for a period of time, and machine 292 can be controlled based on the path information to complete the turn while remaining in an unloading position, such that crop can be unloading during the turn. For sake of illustration, but not by limitation, FIG. 4C is a schematic diagram illustrating one example operation of agricultural machine 200 and support machine 292 utilizing turn sharing in which turn path information is generated by machine 200 and transmitted to machine 292. Machine 200 identifies a harvesting machine turn path 346 to be traversed by machine 200 for the turn. Machine 200 can identify a path offset, representing a distance 347 to be maintained between the machines during the turn. Based on the path offset and a curvature of path 346, machine 200 generates a support machine turn path 348 that corresponds to (e.g., mirrors) the curvature and has the distance 347 from the harvesting machine turn path 346.

Based on the various information generated by path processing system 226, control signal generator 228 generates control signals that are applied to controllable subsystems 206. For instance, control signal generator 228 can generate control signals to control propulsion subsystem 278 to control the speed of harvesting machine 200. By way of example, if harvesting machine 200 is going to be full relatively quickly, but it will take a haulage unit a longer amount of time to reach and unload machine 200, then control signal generator 228 can control propulsion subsystem 278 to slow down harvesting machine 200. Such control may reduce grain losses and may increase the likelihood that the haulage unit will be able to travel to harvesting machine 200 before harvesting machine 200 has reached the capacity of machine 200. In another example, if the georeferenced probability distribution indicates that, given the path harvesting machine 200 is taking, machine 200 will not be full before a haulage unit reaches machine 200, then control signal generator 228 may generate control signals to control propulsion subsystem 278 to increase the speed of harvesting machine 200 so that machine 200 can harvest more crop, and be closer to the capacity of repository 219, when a haulage unit reaches machine 200. These are examples only.

Control signal generator 228 can also generate control signals to control steering subsystem 280. For instance, control signal generator 228 can control steering subsystem 280 to steer harvesting machine 200 along the predefined machine path.

Control signal generator 228 is configured to control communication subsystem 282 to communicate various information within harvesting machine 200 to other machines or systems. In one example, communication subsystem 282 is configured to communicate an indication of a selected unloading mode, turn path, and/or a route to support machine 292, remote computing system 296, or any other machine or system. In another example, communication subsystem 282 can communicate an indication of the selected unloading mode, turn path, and/or route to a mobile device associated with a user of support machine 292. That user can utilize the information to navigate the support machine 292 with machine 200.

Control signal generator 228 can also generate control signals to control operator interface component 284, for example to render an indication of the rendezvous point and/or route.

Figure 5:
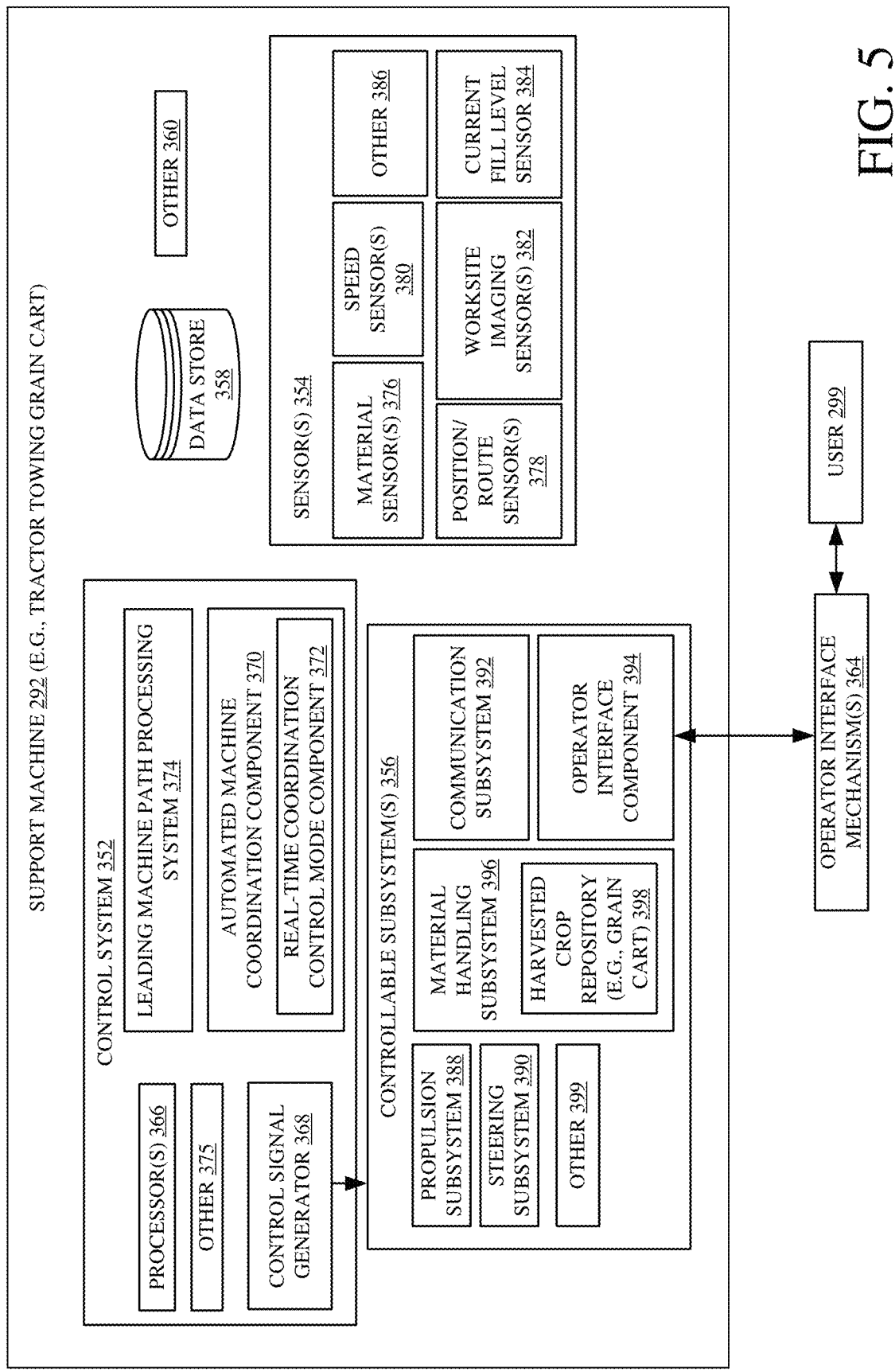
FIG. 5 is a block diagram showing one example of a support machine.

FIG. 5 is a block diagram illustrating one example of support machine 292. As discussed above, machines 200 and 292 can communicate either directly (e.g., network 340), or through network 298. Machine 292 is configured to operate in a coordinated control mode in which machine 292 is controlled, either automatically or based on operator inputs, to operate in a field along with machine 200.

In the example of FIG. 5, machine 292 includes a control system 352, one or more sensors 354, controllable subsystems 356, a data store 358, and can include other items 360 as well. Control system 352 is configured to control operation of machine 292 automatically, and/or based on inputs from an operator (i.e., user 299) through operator interface mechanisms 364. Control system 352, in one example, includes one or more components and functionality similar to that described above with respect to control system 202. As shown in FIG. 5, control system 352 includes one or more processors 366, a control signal generator 368, an automated machine coordination component 370, a leading machine path processing system 374, and can include other items 375 as well.

Sensors 354, in one example, are similar to sensors 204 discussed above with respect to FIG. 2. Illustratively, sensors 354 include one or more material sensors 376, position/route sensors 378, speed sensors 380, worksite imaging sensors 382, a current fill level sensor 384, and can include other sensors 386 as well.

Controllable subsystem 356 include a propulsion subsystem 388, a steering subsystem 390, a communication subsystem 392, an operator interface component 394, a material handling subsystem 396 (which can include a harvested crop repository 398 such as storage portion 338), and can include other items 399 as well.

Automated machine coordination component 370 includes a real-time coordination component 372 configured to interface with component 262 of machine 200, and to operate machine 292 in a real-time coordinated control mode in which operation of machine 292 is coordinated, in real-time, with machine 200. In one example, automated machine coordination component 370 utilizes Machine Sync, discussed above. Automated machine coordination component 370 utilizes a wireless network between machines 200 and 292 to enable on-the-go unloading through synchronization of machine speed and/or direction of travel.

Leading machine path processing system 374 is configured to receive, from machine 200, an indication of a path for machine 292. This is discussed in further detail below. Briefly, however, in one example control system 352 is configured to operate machine 292 in a second mode in which the real-time machine coordination control is deactivated (e.g., disabled, suspended, etc.) for a period of time. In the second mode, a machine path for machine 292 to traverse the field is received from machine 292 through the wireless network. This can include, but is not limited to, a machine path for machine 292 to traverse turns between crop rows in the field.

Figure 6A:
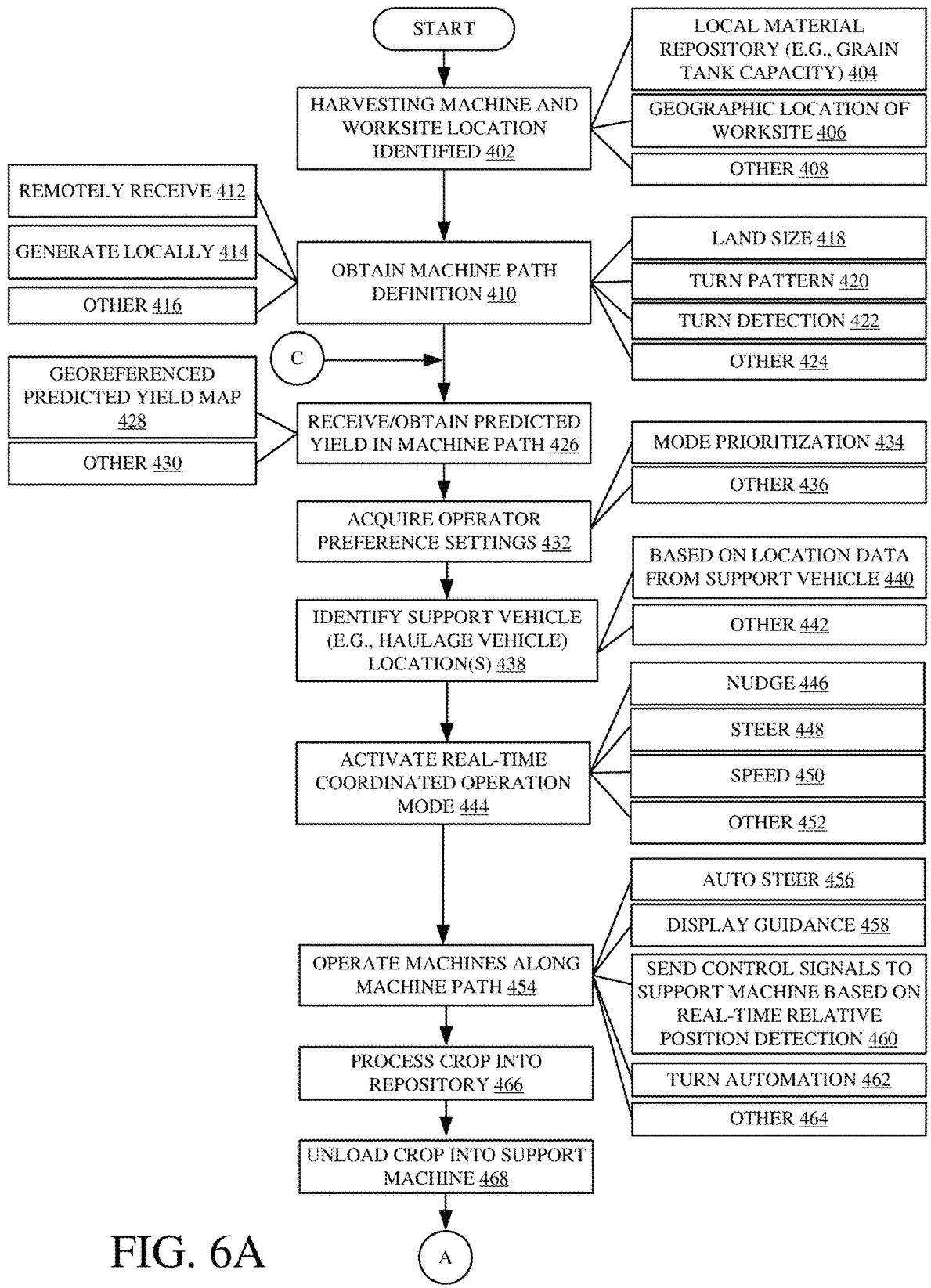
FIGS. 6A, 6B, and 6C (collectively referred to herein as FIG. 6) show a flow chart illustrating one example of operation of an agricultural harvesting machine with support machine coordination control.
Figure 6B:
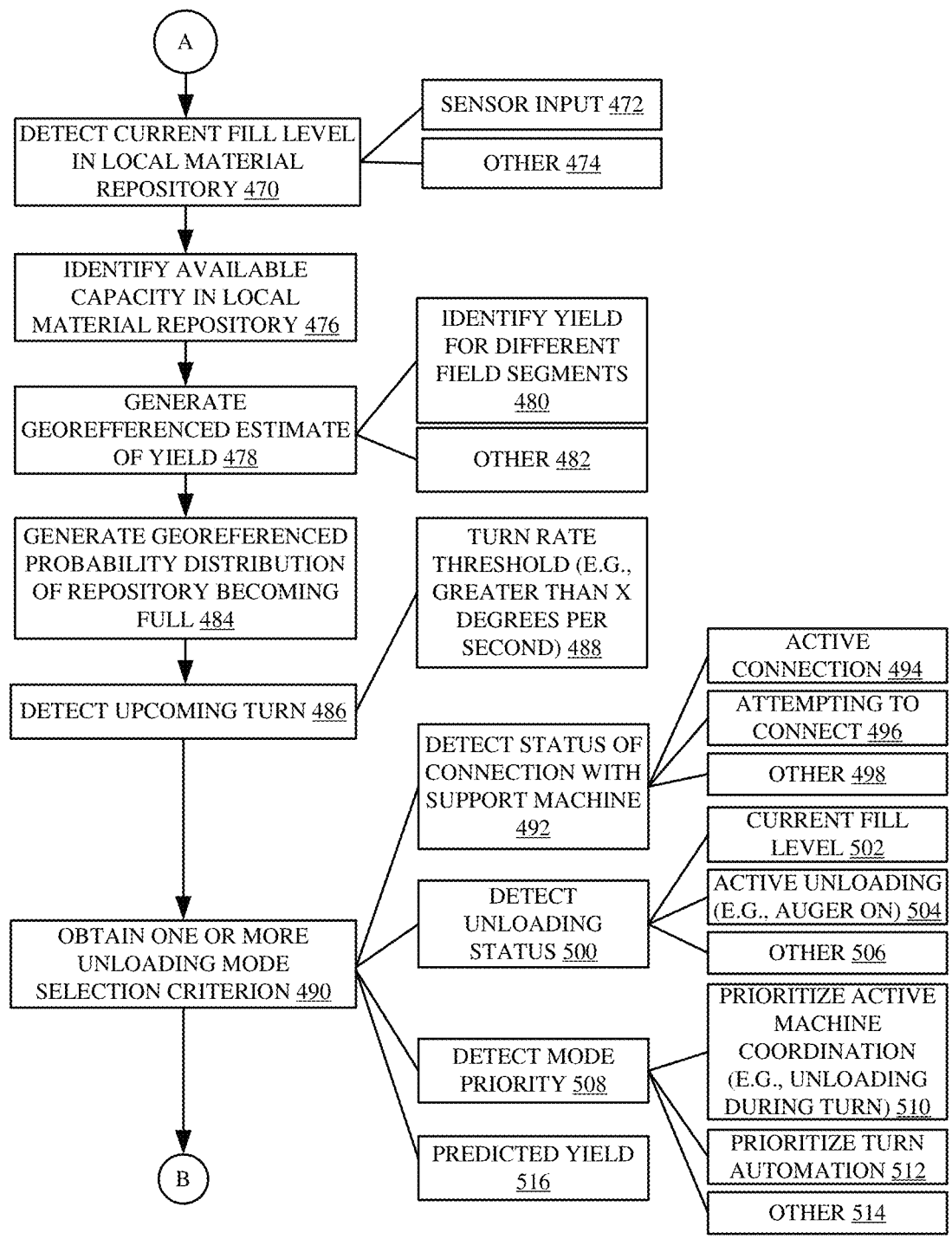
Figure 6C:
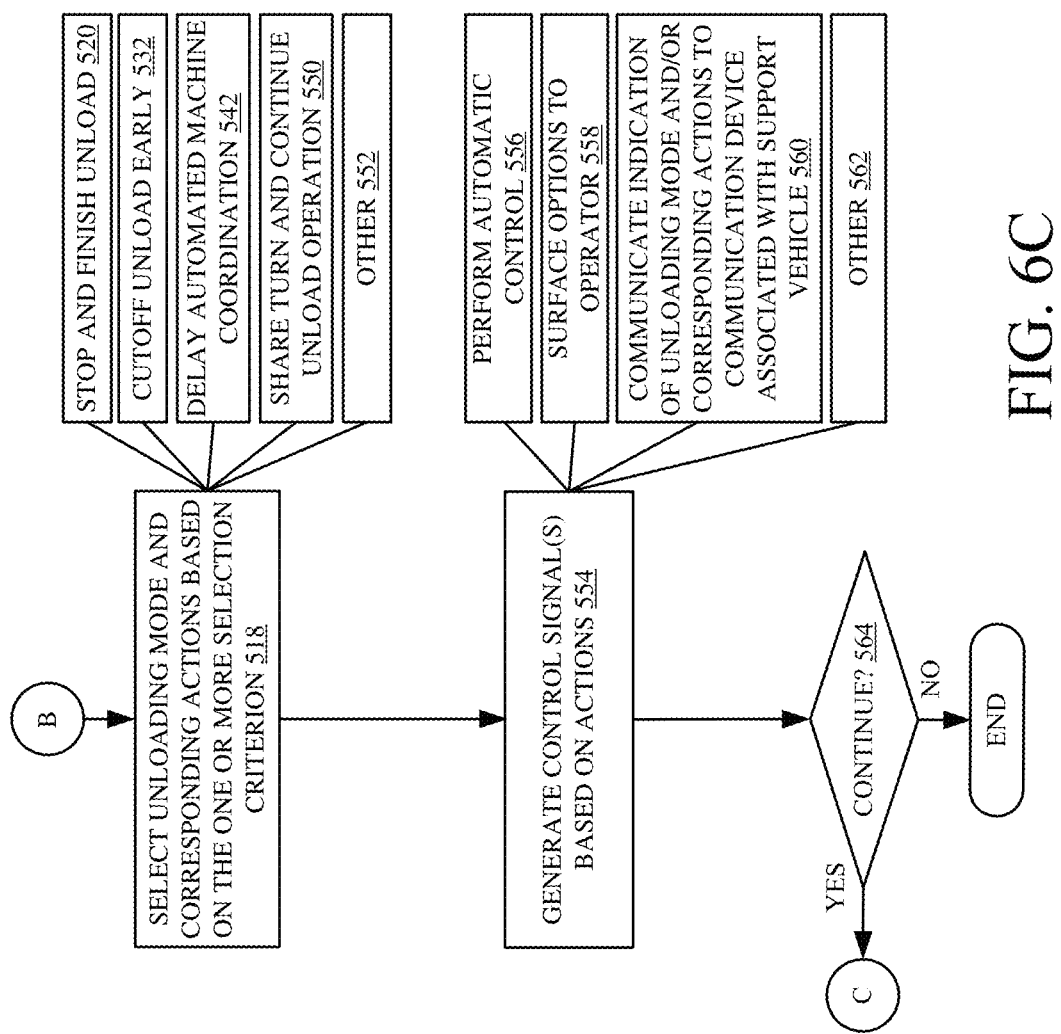

FIGS. 6A, 6B, and 6C (collectively referred to as FIG. 6) provide a flow diagram illustrating one example of operation of an agricultural harvesting machine. For sake of illustration, but not by limitation, FIG. 6 will be described in the context of harvesting machine 200 discussed above with respect to FIG. 2.

At block 402, the harvesting machine 200 and the worksite location (e.g., the field to be harvested) are identified. In one example, the information identifying the particular harvesting machine 200 also includes capacity indicator 218, as represented at block 404. The information can also include the geographic location of the field to be harvested, as represented at block 406, and the information can include a wide variety of other information, as indicated by block 408. A machine path definition is obtained at block 410. As noted above, machine path definition 263 can be remotely received from another machine or system, as represented at block 412. For example, machine path definition 263 can be received from remote computing system 296. Alternatively, or in addition, as represented at block 414 machine path definition 263 can be generated by control system 202, for example based on operator inputs from operator 212 through operator interface mechanisms 290. In one example, operator 212 can provide inputs that map the machine path through the field to be harvested using any of a wide variety of different types of input mechanisms. Of course, the machine path definition can be obtained in other ways as well, as represented at block 416.

The machine path definition identifies a land size of a land in the field to be harvested, as represented at block 418. As discussed above with respect to FIG. 3, the land size 418 can indicate a number of passes in the field to be completed (e.g., six passes in the example of FIG. 3) before moving onto the next land (e.g., moving from land 302 to land 318). Also, the machine path definition can include a turn pattern (block 420), a turn direction (block 422), or other path attributes (block 424). The turn pattern and turn direction indicate how harvesting machine 200 will traverse the land, to complete that section of the field before moving onto the next land. For instance, the turn pattern can include a spiral-in, spiral-out, or any other pattern. The turn direction can indicate whether left turns, right turns, or some combination of left and right turns will be performed to achieve the turn pattern on the land size.

At block 426, map generation component 222 can receive or obtain a predicted yield corresponding to the machine path. In one example, component 222 outputs a georeferenced predicted yield map which identifies predicted yield at different geographical locations within the field, as represented at block 428. The yield map can be based on the yield estimate received from yield estimation system 214. Also, component 222 can output a georeferenced yield error estimate which identifies an estimate of error at the geographic locations with the field, for which the yield has been estimated. The georeferenced yield and corresponding error map can be output for the machine path of harvesting machine 200 through the field where machine 200 is harvesting. The yield estimates can be generated for segments of the field along the current pass of machine 200 and one or more subsequent passes corresponding to the land size, turn pattern, and turn direction defined in the machine path definition. Thus, the yield map identifies the predicted yield that will be encountered by machine 200 as machine 200 traverses the field along the machine path defined by machine path definition 263.

Of course, the predicted yield can be received and obtained in other ways as well, as represented by block 430.

At block 432, operator preference settings are acquired. The operator preference settings can be received from operator 212 through operator interface mechanisms 290, obtained from data store 208, or obtained in any of a number of other ways. The operator preference settings can be associated with the identity of the particular operator 212, so that the operator preference settings for the particular operator can be retrieved based on obtaining the identity of the operator 212 for the current operation of machine 200.

As represented by block 434, the operator preference settings can indicate an unloading mode prioritization, that can be utilized by mode prioritization component 264 to identify which unloading mode is to be utilized for a particular scenario. For example, the mode prioritization can prioritize turn automation performed by turn automation component 244 over real-time coordination control performed by coordination component 248. In other examples, the machine coordination can be prioritized over turn automation. This is discussed in further detail below. Briefly, however, depending on the mode prioritization, control system 202 can determine whether stationary or on-the-go unloading is to be performed at a given location on the field. Of course, the operator preference settings can indicate other preferences as well, as represented by block 436.

At block 438, component 246 identifies one or more support vehicles (e.g., haulage vehicles 292) and their corresponding locations. For example, a location of the vehicles can be identified based on location data (e.g., GPS coordinates, etc.) received from the support vehicles, as represented at block 440. Of course, the support vehicles and their corresponding locations can be identified in other ways as well, as represented at block 442.

At block 444, coordination component 248 activates real-time coordination control mode component 262 to perform real-time coordination of support machine 292 with harvesting machine 200. The real-time coordination mode establishes a communication link between machines 200 and 292 through which machine 200 can generate control signals to maintain machine 292 in an unloading position (such as that illustrated above with respect to FIG. 4A) as machine 200 traverses the field. Machine coordination control can include, but is not limited to, machine 200 sending a nudge signal (block 446) to nudge and momentarily change the speed of machine 292. Also, the real-time coordination mode component can generate signals to control the steering of machine 292 (block 448), the speed of machine 292 (block 450), as well as other controls (block 452).

Machine 200 is operated along the machine path as represented at block 454. For example, harvesting machine 200 can be automatically controlled, by control system 202 controlling steering subsystem 280 and/or propulsion subsystem 278, as represented by block 456. Alternatively, or in addition, control system 202 can control operator interface component 284 to render an indication of the machine path, to display or otherwise render guidance to operator 212, as represented at block 458. For example, operator interface component 284 can display or otherwise render a representation of a map with guidance lines that identify the machine path. Alternatively, or in addition, operator interface component 284 can output operator control inputs (e.g., suggested machine speed, turn inputs, etc.) to be provided by operator 212 to control harvesting machine 200 to traverse the field along the machine path. Also, control signals can be sent to support machine 292 based on real-time relative position detection, as represented at block 460. For example, agricultural machine 200 can detect the position of support machine 292, relative to the transfer mechanism (e.g., mechanism 332 shown in FIG. 4A), and generate a nudge signal to move support machine 292 so that the transfer mechanism is located over a particular area of the repository of support machine 292. The relative position detection can be performed using sensors 204 and/or communication subsystem 282. For instance, imaging sensors 274 can obtain images that are processed to identify the location of support machine 292. In another example, an indication of the position can be received through, or obtained based on an indication of, the communications between machines 200 and 292.

At block 462, turn automation is performed by turn automation component 244, based on machine path definition 263. An example turn automation includes controlling machine 200 so that the header of the harvesting machine follows the harvesting paths through the various passes over the field, as well as performing turns in between the passes, which operate to stitch together guidance lines representing the passes defined in the machine path definition 263.

The machine can be operated in other ways as well, as represented at block 464.

As harvesting machine 200 traverses the field, at block 466 material handling subsystem 286 engages crop in the field, performs crop processing operations on the crop, and moves the processed crop to harvested crop repository 219.

At block 468, material handling subsystem 286 is controlled to unload the harvested crop into support machine 292. As noted above, unloading can be done while the machines are stationary as well as while the machines are moving through control of coordination component 248 and/or turn automation component 244.

At block 470, remaining capacity identifier component 224 receives a current fill level of repository 219. The current fill level can be based on a sensor input (block 472), or the current fill level can be obtained in other ways as well, as indicated by block 474. Remaining capacity identifier component 224 then identifies the available capacity (or remaining capacity) in repository 219 (in the grain tank), as represented at block 476. For instance, the current fill level (or measured amount) of material in the grain tank can be subtracted from the capacity of repository 219 to give the remaining capacity.

Path processing system 226 identifies the machine path through the field being harvested and correlates the path with the yield and corresponding error map generated by component 222. Cumulative yield identifier component 236, in one example, identifies the cumulative yield, for different sections along the path. Generating a georeferenced estimative yield is indicated by block 478. Identifying cumulative expected yield across different segments for the machine path is indicated by block 480. Of course, the georeferenced estimative yield can be generated in other ways as well, as represented at block 482.

Generator component 238 generates the georeferenced probability distribution of repository 219 becoming full. For instance, component 238 generates a probability distribution identifying different probabilities, at different geographic locations, where those probabilities are indicative of the probability that the grain tank on machine 200 will be full, at that particular geographic location, as represented at block 484.

At block 486, turn detection component 256 detects an upcoming turn to be performed by agricultural machine 200 on the field. In one example, detection of the turn is based on determining an estimated turn rate that machine 200 will experience during the turn (e.g., degrees per second), and comparing that turn rate to a turn rate threshold, as represented at block 488. The turn rate threshold can be predefined, defined based on operator input by operator 212, determined dynamically by control system 202 based on operator of machine 200, or determined in other ways as well.

One or more unloading mode selection criterion are obtained at block 490. An unloading mode selection criterion can be based on any of a number of operational characteristics. For example, as represented at block 492, a status of the connection of coordination component 248 with support machine 292 can be identified by connection status monitor 258. For instance, monitor 258 can determine that an active connection between machines 200 and 292 is established, as represented at block 494. Also, monitor 258 can determine that an active connection is not currently established, but component 248 is attempting to connect with machine 292 to enter the real-time coordination control mode, as represented at block 496. Of course, other connection statuses can be detected as well, as represented at block 498.

Also, an unloading mode selection criterion can include detecting an unloading status, as represented at block 500. For example, an unloading status can include determining the current fill level of repository 219, as represented at block 502. Also, the unloading status can indicate whether the transfer mechanism of machine 200 is actively unloading into support machine 292, as represented at block 504. For instance, a signal can be received that indicates whether an auger of an unloading spout is active. Of course, the other unloading statuses can be detected, as represented at block 506.

Also, the unloading mode selection criteria can include a mode priority, detected at block 508. The mode priority can be generated based on operator preferences, and can be predefined or dynamically determined during operation of machine 200. In one example, the mode priority prioritizes active machine coordination as represented at block 510. For instance, block 510 can prioritize or weight unloading into support machine 292 more than turn automation performed by component 244. Put another way, in one example block 510 weights a stationary unloading prior to entering a turn higher relative to turn automation that continues to control machine 200 through the turn.

In another example, turn automation can be prioritized at block 512. Thus, in one example, active control by turn automation component 244 to control machine 200 through a turn can be prioritized over a stationary unloading prior to the turn. Of course, the mode priority can be detected in other ways as well, as represented at block 514.

Also, an unloading mode selection criterion can be based on the predicted yield in a path of machine 200, as represented at block 516. The predicted yield at block 516 and the current fill level at block 502 can be used as an indication as to where repository 219 is likely to become full in the path ahead of machine 200.

At block 518, an unloading mode is selected based on the one or more selection criterion obtained at block 490. The unloading mode includes one or more corresponding actions to be performed to execute the unloading mode.

In one example, an unloading mode includes a "stop and finish" unloading mode as represented at block 520. In one example, the stop and finish unloading mode is based on monitor 258 determining an active connection status between machines 200 and 292 and that the transfer mechanism (e.g., the auger in a spout) is actively unloading into support machine 292. In this case, the real-time coordination control mode can be maintained to slow both machines while the transfer mechanism continues to unload repository 219. The machines can be stopped, as needed, before reaching the upcoming turn.

Figure 7:
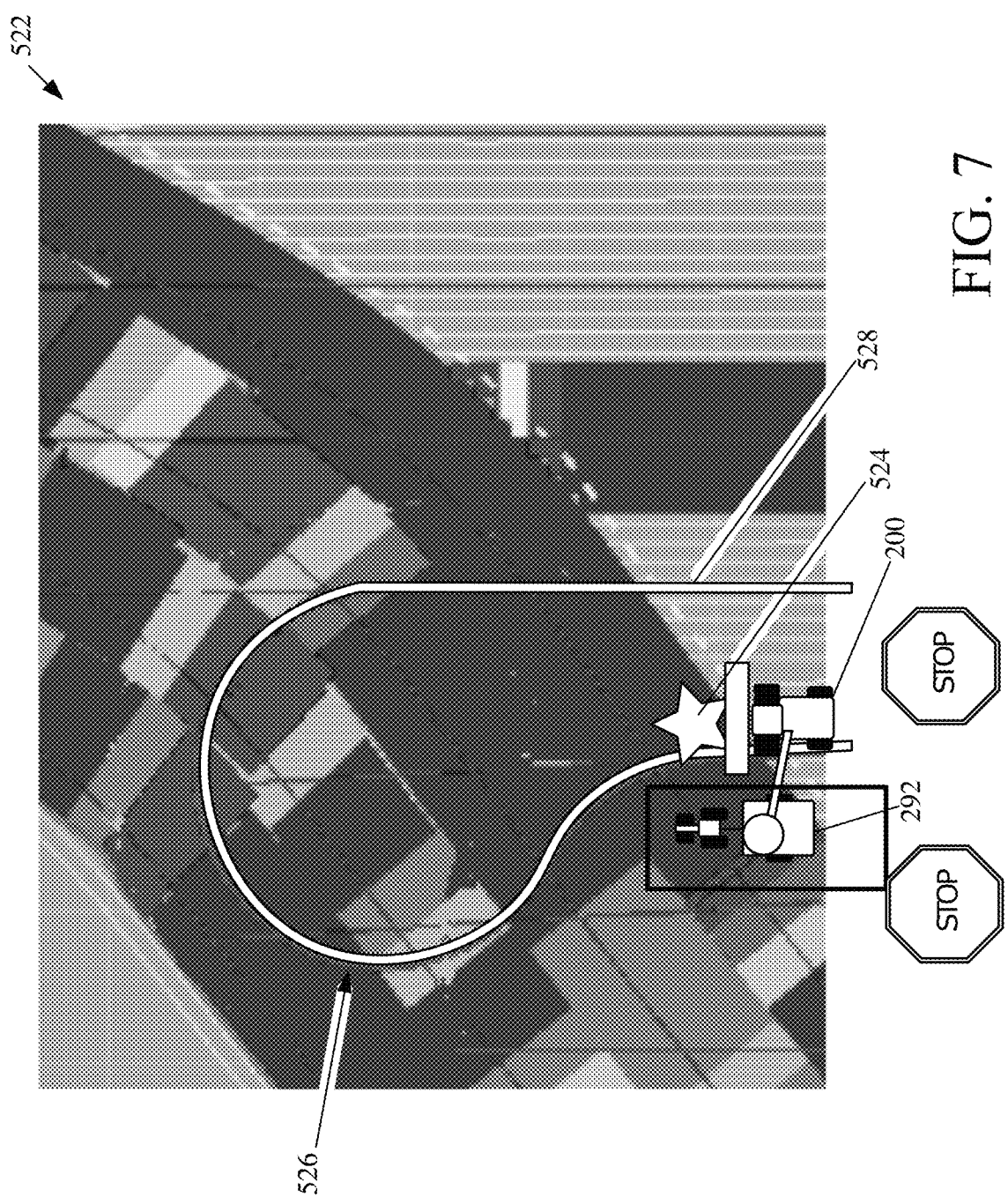
FIG. 7 shows a user interface display illustrating one example of an unloading mode.

FIG. 7 shows an example user interface display 522 illustrating an example of the unloading mode at block 520. Here, machines 200 and 292 are stopped when the machines reach a field location, represented by icon 524, prior to the turn represented by path line 526. Upon monitor 260 determining that the unloading process has completed, turn automation component 244 can continue execution of the turn to enter a subsequent pass 528.

Referring again to FIG. 6, another example of an unloading mode, represented at block 532, includes an early unload cutoff where the unloading process is suspended, before repository 219 is completely unloaded. In one example, mode 532 is selected based on the current fill level and/or the mode priority at block 508 indicating that turn automation is to be prioritized over machine coordination.

Figure 8B:
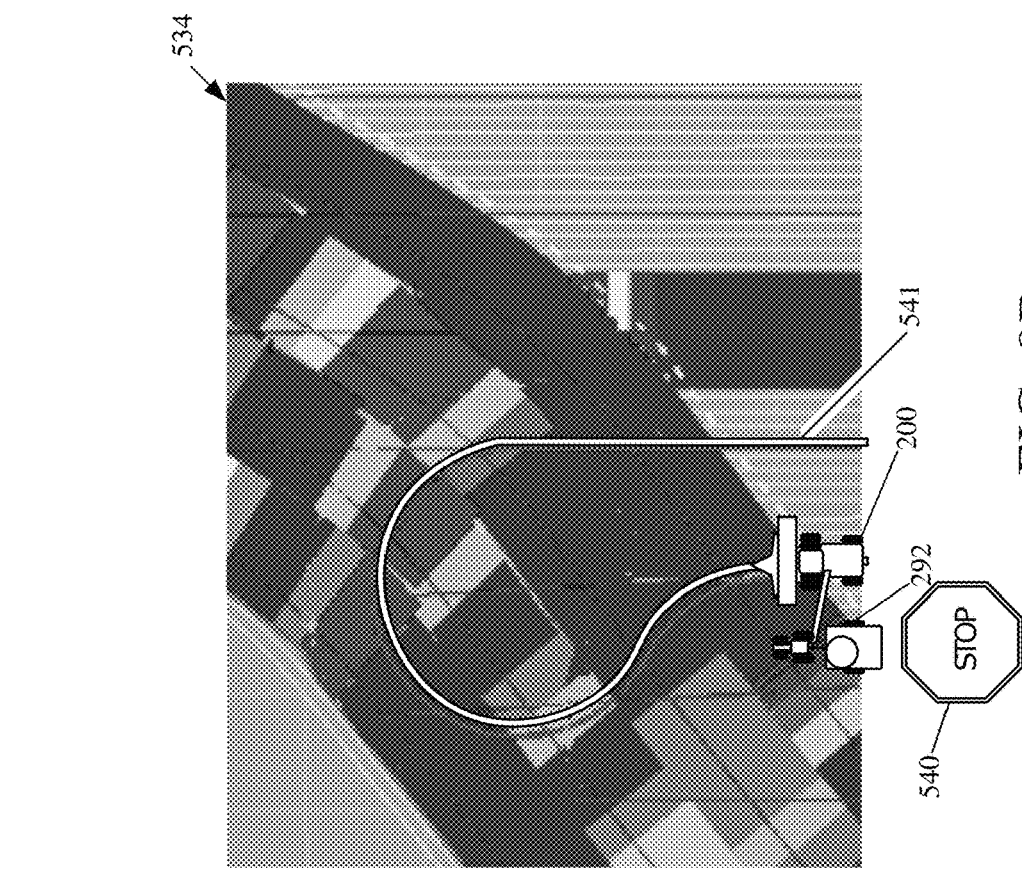
FIGS. 8A and 8B (collectively referred to as FIG. 8) show a user interface display illustrating one example of an unloading mode.
Figure 8A:
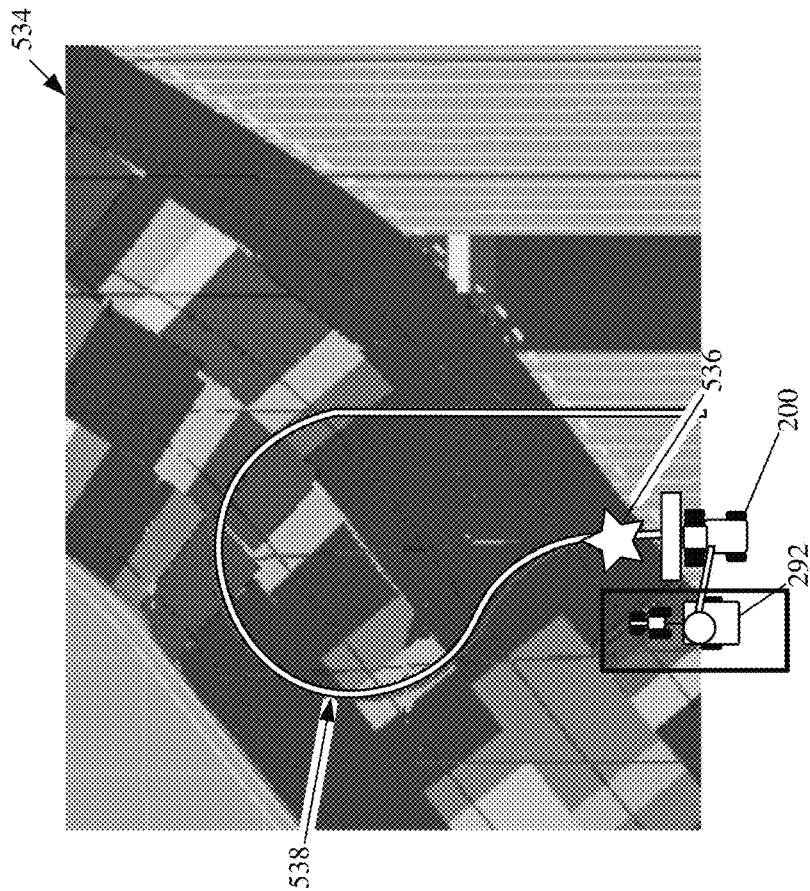

FIGS. 8A and 8B (collectively referred to as FIG. 8) show an example user interface 534 illustrating operation of the unloading mode represented at block 522. As shown in FIG. 8, when machines 200 and 292 reach a point represented by display element 536 prior to the turn represented by line 538, the coordination mode that controls machine 292 is suspended or deactivated, as represented by display element 540. Here, the transfer mechanism of machine 200 is turned off and turn automation component 244 continues to control machine 200 through the turn into the subsequent path represented by guidance line 541. In one example, an operator of support machine 292 manually drives support machine 292 to a position alongside machine 200 in the subsequent path, upon which real-time coordination control mode component 262 can resume the real-time coordination control mode.

Referring again to FIG. 6, another example of an unloading mode is represented at block 542, where the automated machine coordination is delayed until after the turn is completed by the machines. In one example, the control mode at block 542 is selected based on monitor 258 determining that a connection between the machines is not yet established (e.g., machine 200 is not actively unloading into support machine 292).

Figure 9B:
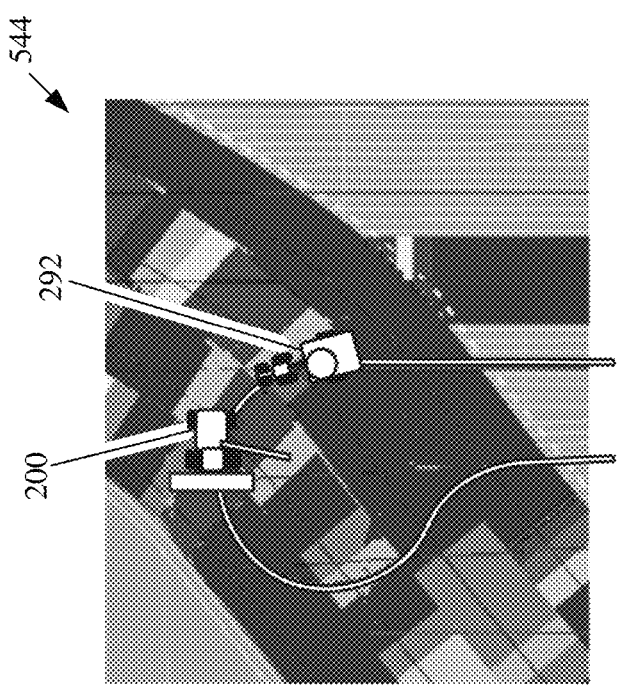
FIGS. 9A, 9B, and 9C (collectively referred to as FIG. 9) show a user interface display illustrating one example of an unloading mode.
Figure 9A:
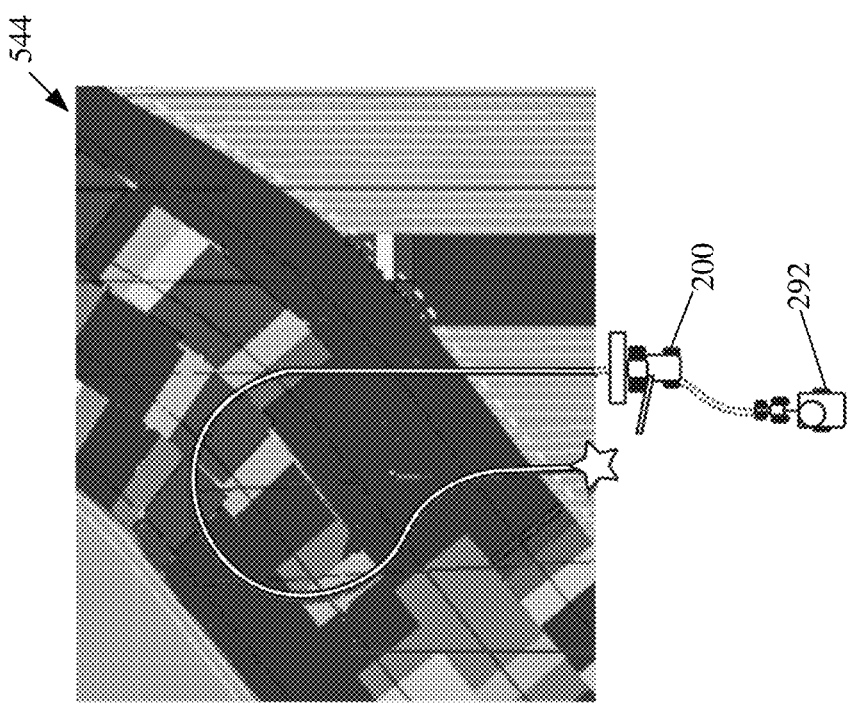
Figure 9C:
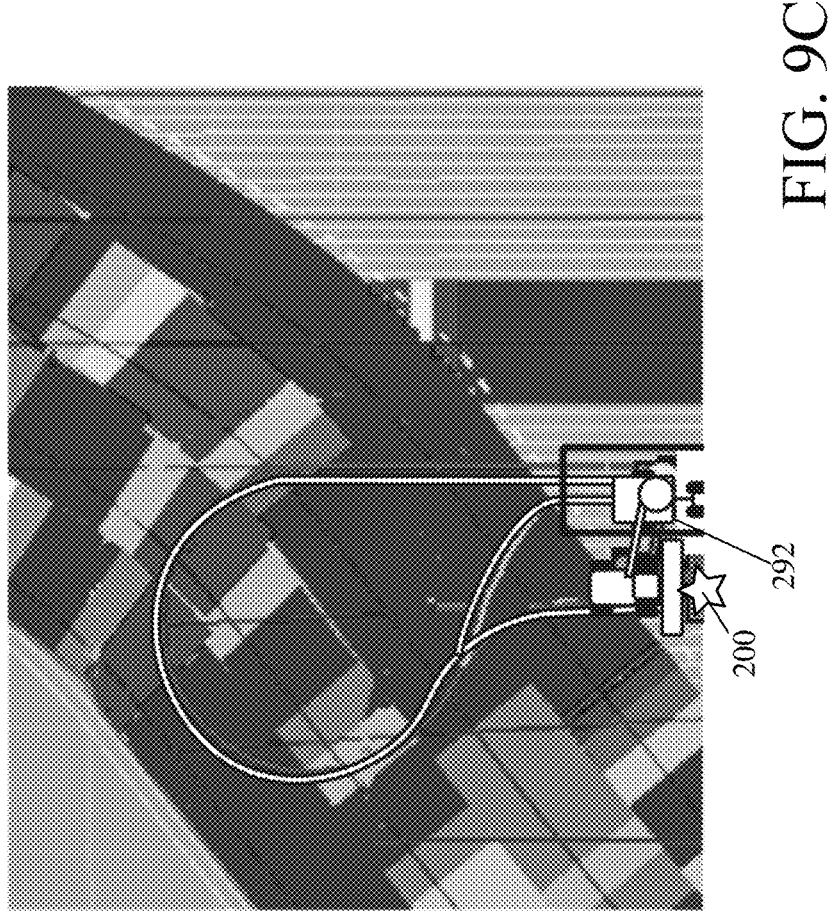

FIGS. 9A, 9B, and 9C (collectively referred to as FIG. 9) show an example user interface 544 illustrating the mode at block 542. As shown, support machine 292 is not currently in an unloading position and the coordinated mode has not been established between the machines. Turn automation component 244 commands machine 200 through the turn and into the subsequent pass. Machine 292 is controlled (automatically or through operator input) into the unloading position, shown in FIG. 9C, where the connection between the machines can be established for subsequent coordination control in the subsequent pass.

Referring again to FIG. 6, another example of an unloading mode is represented at block 550, where turn information is shared by machine 200 to support machine 292. In one example, the unloading mode at block 550 is selected based on operator preferences that indicate that coordinated machine operation should occur in conjunction with turn automation performed by component 244.

One example of the unloading mode at block 550 is discussed below with respect to FIGS. 10, 11, and 12. Briefly, however, in one example machine 200 determines a turn path for support machine 292 based on the turn path machine 200 will take to execute the turn in the field. Machine 200 communicates the support machine turn path to support machine 292, which can be controlled based on that path information.

Of course, other unloading modes can be selected as well, as represented at block 552.

A block 554, control signal generator 228 generates a control signal based on the selected unloading mode. In one example, the control signal can perform automatic control of machine 200, as represented at block 556. For example, control system 202 can control subsystems 206 to execute the unloading mode. Alternatively, or in addition, at block 558 options can be surfaced to operator 212 to perform the selected unloading mode. As represented at block 560, the control signals can control communication subsystem 282 to communicate an indication of the unloading mode and/or corresponding actions to a communication device associated with the support machine. For example, the indication can be sent to a control system of support machine 292 for automated control of support machine 292 and/or to render the indication on operator interface devices. In another example, the indication can be communicated to a mobile device associated with user 299, who can manually control support machine 292.

Of course, control signals can be generated to control machine 200 in other ways as well, as represented by block 562.

At block 564, if the operation is continued for subsequent areas of the field.

Figure 10:
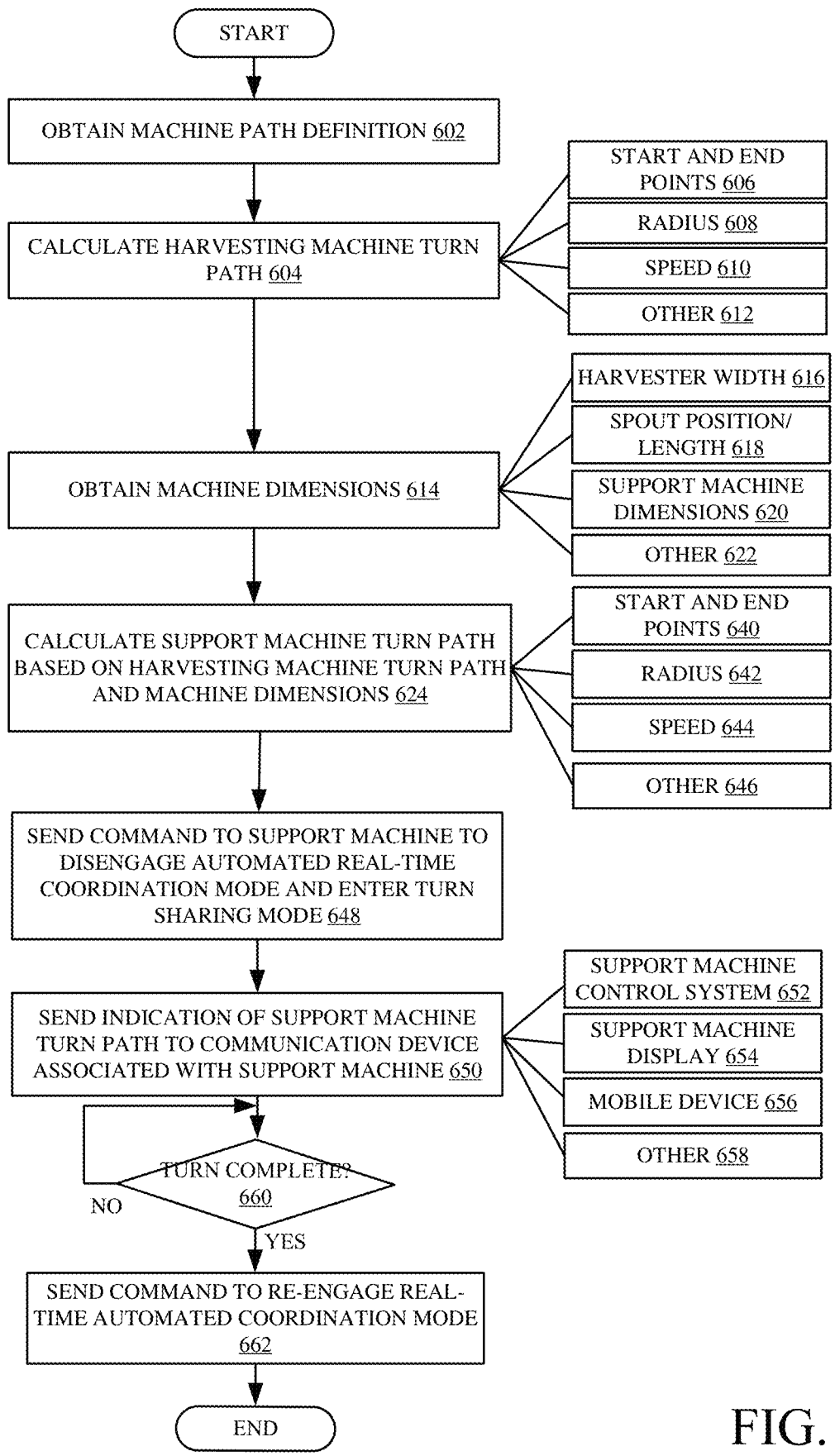
FIG. 10 is a flow diagram illustrating one example of operation of an agricultural machine in an unloading mode.

FIG. 10 is a flow diagram illustrating one example of operation of agricultural machine 200 for the unloading mode represented at block 550.

At block 602, machine path definition 263 is obtained. At block 604, a harvesting machine turn path is calculated based on the machine path definition. As noted above, a turn can occur during a given pass over the field, as well as in between successive passes, such as when machine 200 is turning in a headlands area of the field.

The harvesting machine turn path can include start and end points of the turn to be performed by machine 200 (block 606), a radius of the turn or a portion of the turn (block 608), and/or a speed (block 610) of machine 200 during the turn. Of course, the harvesting machine turn path can identify other aspects associated with the turn as well, as represented at block 612.

At block 614, machine dimensions can be obtained. For instance, machine dimensions can include a width of agricultural machine 200, as represented at block 616. For instance, block 616 can indicate a width of the header. Also, the machine dimensions can indicate a position and/or length of the transfer mechanism (e.g., mechanism 332 shown in FIG. 4A) as represented at block 618. Also, the machine dimensions can include dimensions of the support machine, as represented at block 620. Of course, other machine dimensions can be obtained as well, as represented at block 622.

At block 624, system 226 calculates a support machine turn path based on the harvesting machine turn path identified at block 604 and/or the machine dimensions obtained at block 614. In one example, the support machine turn path corresponds to the harvesting machine turn path, such as by being portions of respective concentric circles, offset from one another based on a distance that support machine 292 maintains when being unloaded by the transfer mechanism of machine 200.

Figure 11:
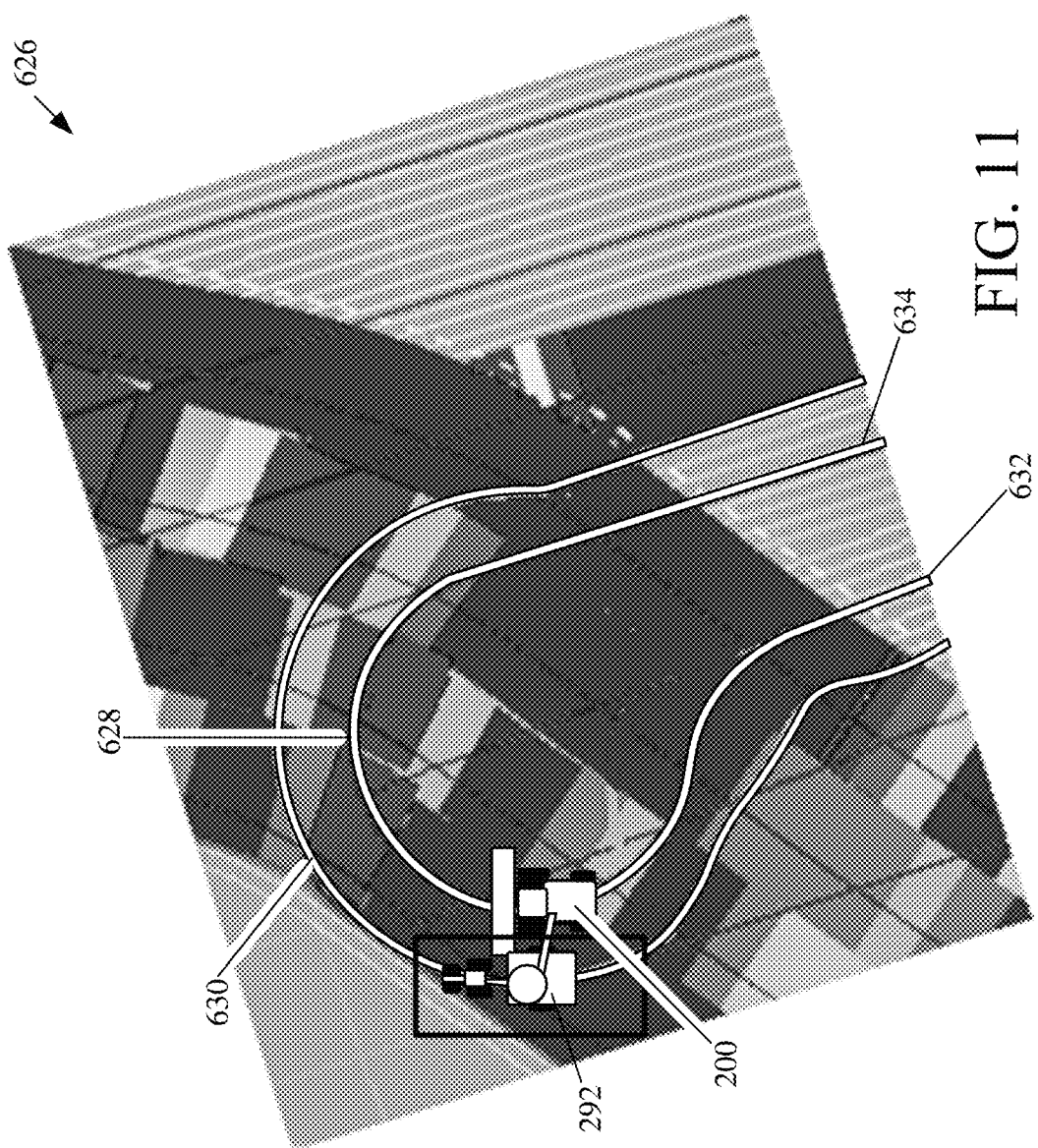
FIG. 11 shows a user interface display illustrating an example harvesting machine turn path and corresponding support machine turn path.

FIG. 11 shows an example user interface 626 illustrating a harvesting machine turn path 628 and a corresponding support machine turn path 630. As shown, both machines 200 and 292 enter the turn in an area represented at reference numeral 632, and are controlled along the respective turn paths such that machine 200 can unload into support machine 292 during the turn, and into the subsequent pass represented by guidance line 634.

Referring again to FIG. 10, the support machine turn path can indicate the start and end point (block 640) for the support machine turn, a radius (block 642) of the turn path or portion of the turn path, a speed (block 644) for support machine 292, and can indicate other aspects of the turn as well, as represented at block 646.

At block 648, a command is sent to the support machine to deactivate the automated real-time coordination mode and to enter a turn sharing mode. At block 650, an indication of the support machine turn path is sent to a communication device associated with support machine 292. For example, the indication can be sent to a control system of support machine 292 (block 652), to a display device associated with a support machine (block 654) (such as a display device in an operator compartment) and/or a mobile device (block 656) associated with the operator of support machine 292. Of course, the indication could be sent in other ways as well, as represented at block 658.

At block 660, when the turn is completed, a command to reengage the real-time automated coordination mode is sent to support machine 292, as represented at block 662.

Figure 12:
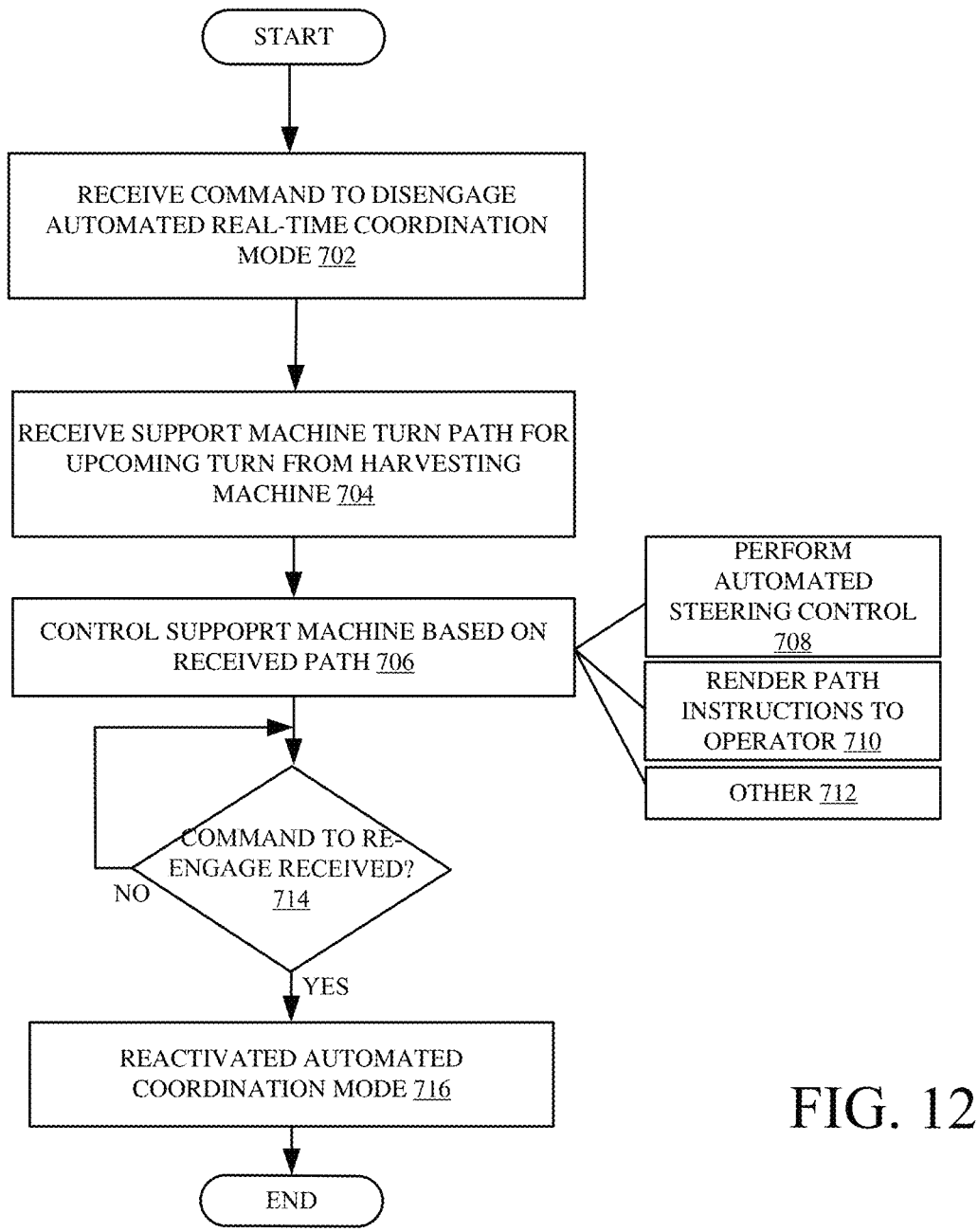
FIG. 12 is a flow diagram illustrating one example of operation of a support machine during an unloading mode.

FIG. 12 is a flow diagram illustrating one example of operation of support machine 292 during the unloading mode at block 550.

At block 702, a command to disengage the automated real-time coordination mode is received. At block 704, support machine 292 receives a support machine turn path for the upcoming turn from machine 200. At block 706, support machine 292 is controlled based on the received path information. For example, the control can include performing automated steering control at block 708 and/or rendering path instructions to the operator at block 710. Of course, support machine 292 can be controlled in other ways as well, as represented at block 712.

At block 714, the operation determines whether a command to reengage the coordination mode is received. If so, the automated real-time coordination mode is reactivated at block 716.

It can thus be seen that the present features provide a system that controls coordinated operation of a haulage vehicle, or other support machine, with a harvesting machine as the machines approach field turns. The present system improves unloading operations, for example by providing on-the-go unloading during turns in the field. This can improve harvesting performance and allow for unloading operations to be performed during field operations that are otherwise unproductive or have sub-optimal productivity.

The present discussion has mentioned processors and servers. In one example, the processors and servers include computer processors with associated memory and timing circuitry, not separately shown. The processors and servers are functional parts of the systems or devices to which the parts belong and are activated by, and facilitate the functionality of the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can be actuated in a wide variety of different ways. For instance, user actuatable input mechanisms can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, the user actuatable input mechanisms can be actuated using touch gestures. Also, where the device that displays them has speech recognition components, the user actuatable input mechanisms can be actuated using speech commands.

A number of data stores have also been discussed. It will be noted the data stores can each be broken into multiple data stores. All of the data stores can be local to the systems accessing the data stores, all of the data stores can be remote, or some data stores can be local while others can be remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, logic, and interactions. It will be appreciated that any or all of such systems, components, logic and interactions may be implemented by hardware items, such as processors, memory, or other processing components, including but not limited to artificial intelligence components, such as neural networks, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 13:
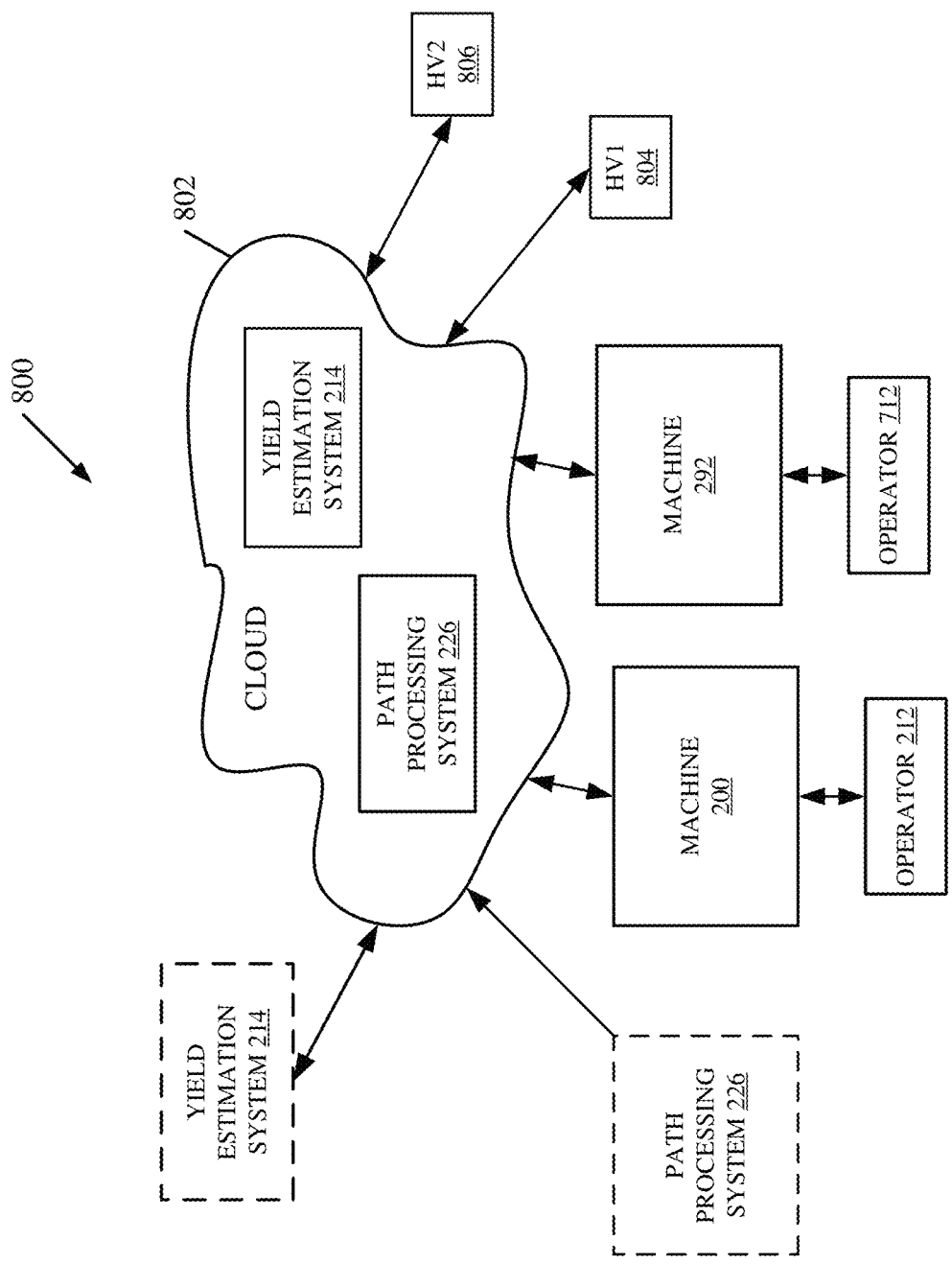
FIG. 13 is a block diagram showing one example of an agricultural harvesting machine deployed in a remote server environment.

FIG. 13 is a block diagram of machine 200, shown in FIG. 2, where machine 200 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and the remote servers can be accessed through a web browser or any other computing component. Software or components shown in FIG. 2 as well as the corresponding data, can be stored on servers at a remote location. The computing resources in a remote server environment can be consolidated at a remote data center location or the computing resources can be dispersed. Remote server infrastructures can deliver services through shared data centers, even though the infrastructures appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 13, some items are similar to those shown in FIG. 2 and the items are similarly numbered. FIG. 13 specifically shows that path processing system 226, and yield estimation system 214 can be located at a remote server location 802. Therefore, machine 200 accesses those systems through remote server location 802. Further, one or more haulage vehicles 804, 806 can access machine 200 and/or the corresponding systems through remote server location 802.

FIG. 13 also depicts another example of a remote server architecture. FIG. 13 shows that it is also contemplated that some elements of FIG. 2 are disposed at remote server location 802 while others are not. By way of example, path processing system 226, yield estimation system 214, and/or other systems or logic can be disposed at a location separate from location 802, and accessed through the remote server at location 802. Regardless of the systems or logic are located, they can be accessed directly by machine 200, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As machine 200 comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on machine 200 until the machine 200 enters a covered location. The machine 200, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
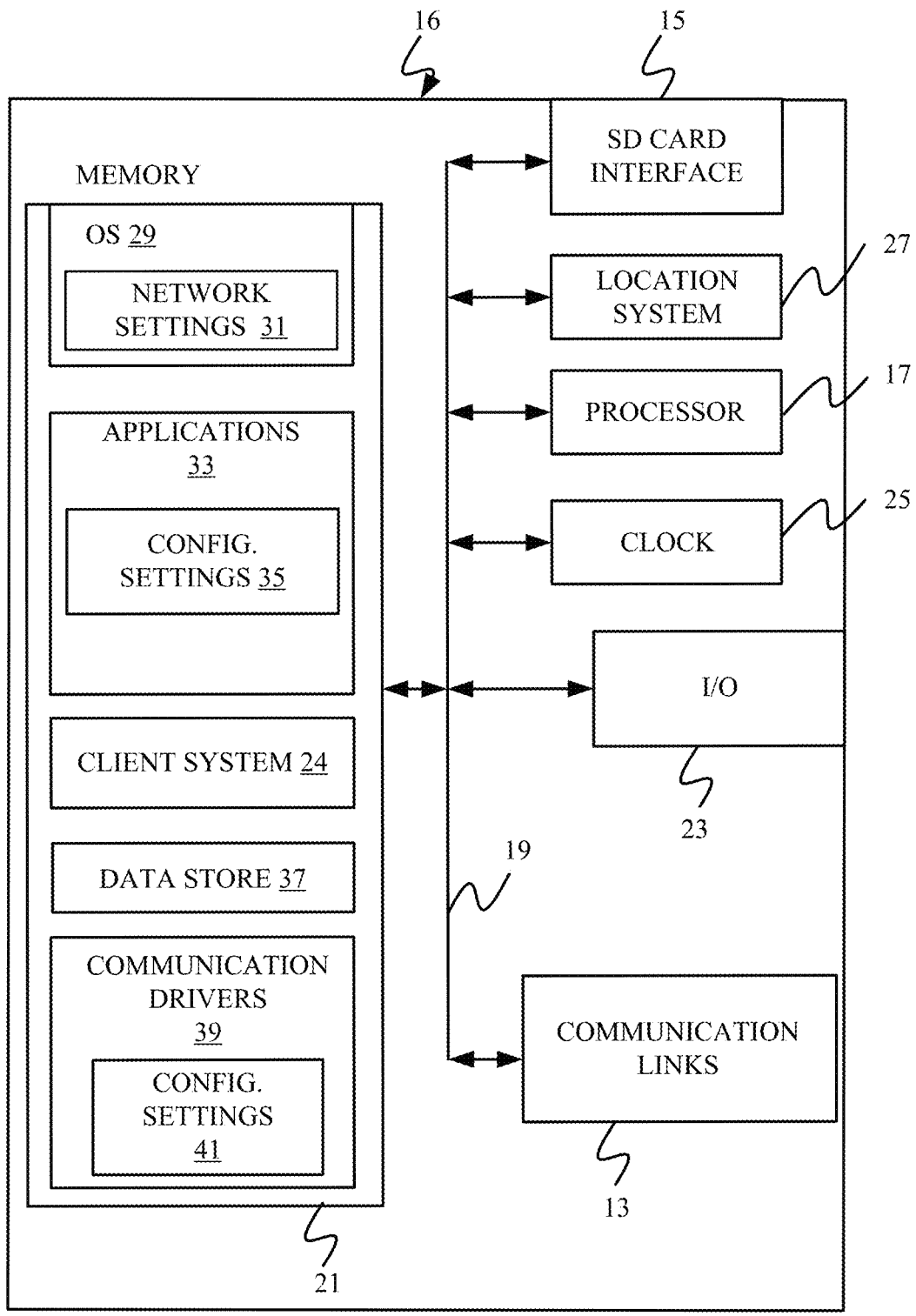
FIGS. 14-16 show examples of mobile devices that can be used in the architectures shown in the previous figures.
Figure 15:
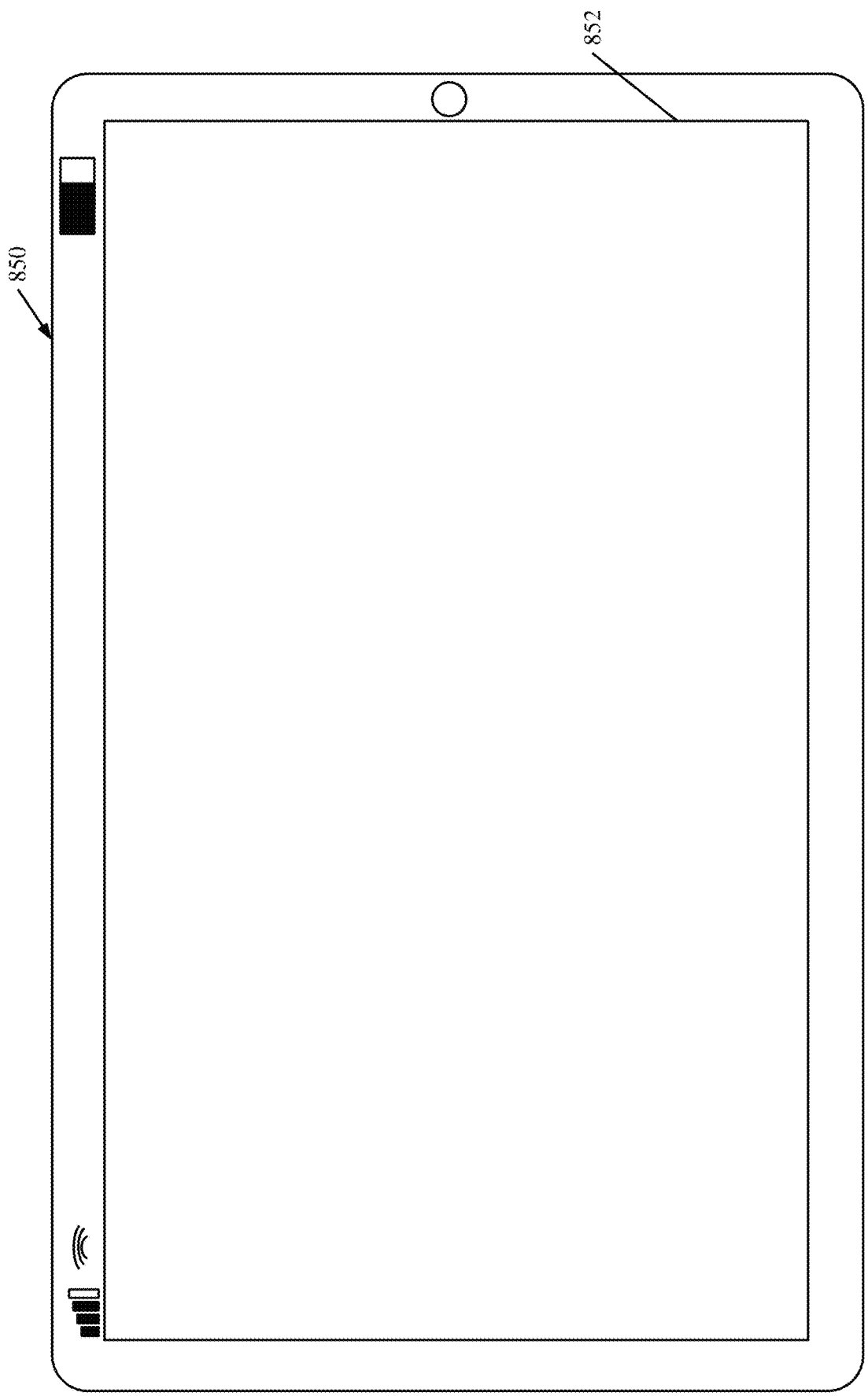
Figure 16:
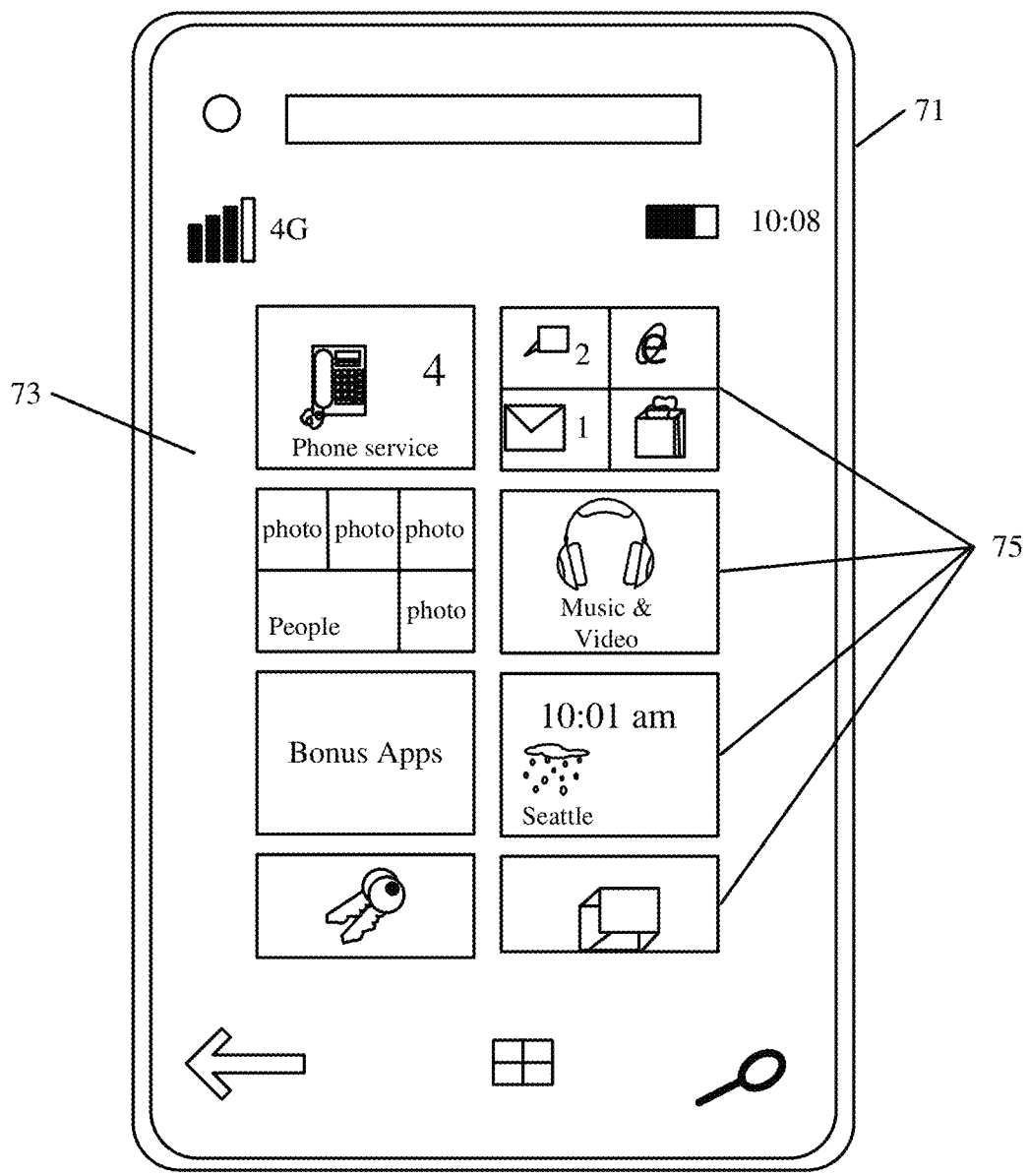

FIG. 14 is a simplified block diagram of one example of a handheld or mobile computing device that can be used as a user's or client's handheld device 16, in which the present system (or parts of it) can be deployed. For instance, a mobile device can be deployed in the operator compartment of machine 200 and/or machine 292 for use in generating, processing, or displaying the yield estimation data, path processing data, and/or obstacle avoidance data. FIGS. 15-16 are examples of handheld or mobile devices.

FIG. 14 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. Clock 25 can also, illustratively, provide timing functions for processor 17.

Location system 27 illustratively includes a component that outputs a current geographical location of device 16. Location system 27 can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 15 shows one example in which device 16 is a tablet computer 850. In FIG. 15, computer 850 is shown with user interface display screen 852. Screen 852 can be a touch screen or a pen-enabled interface that receives inputs from a pen or stylus. Computer 850 can also use an on-screen virtual keyboard. Of course, computer 850 might also be attached to a keyboard or other user input device through a suitable attachment mechanism, such as a wireless link or USB port, for instance. Computer 850 can also illustratively receive voice inputs as well.

FIG. 16 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
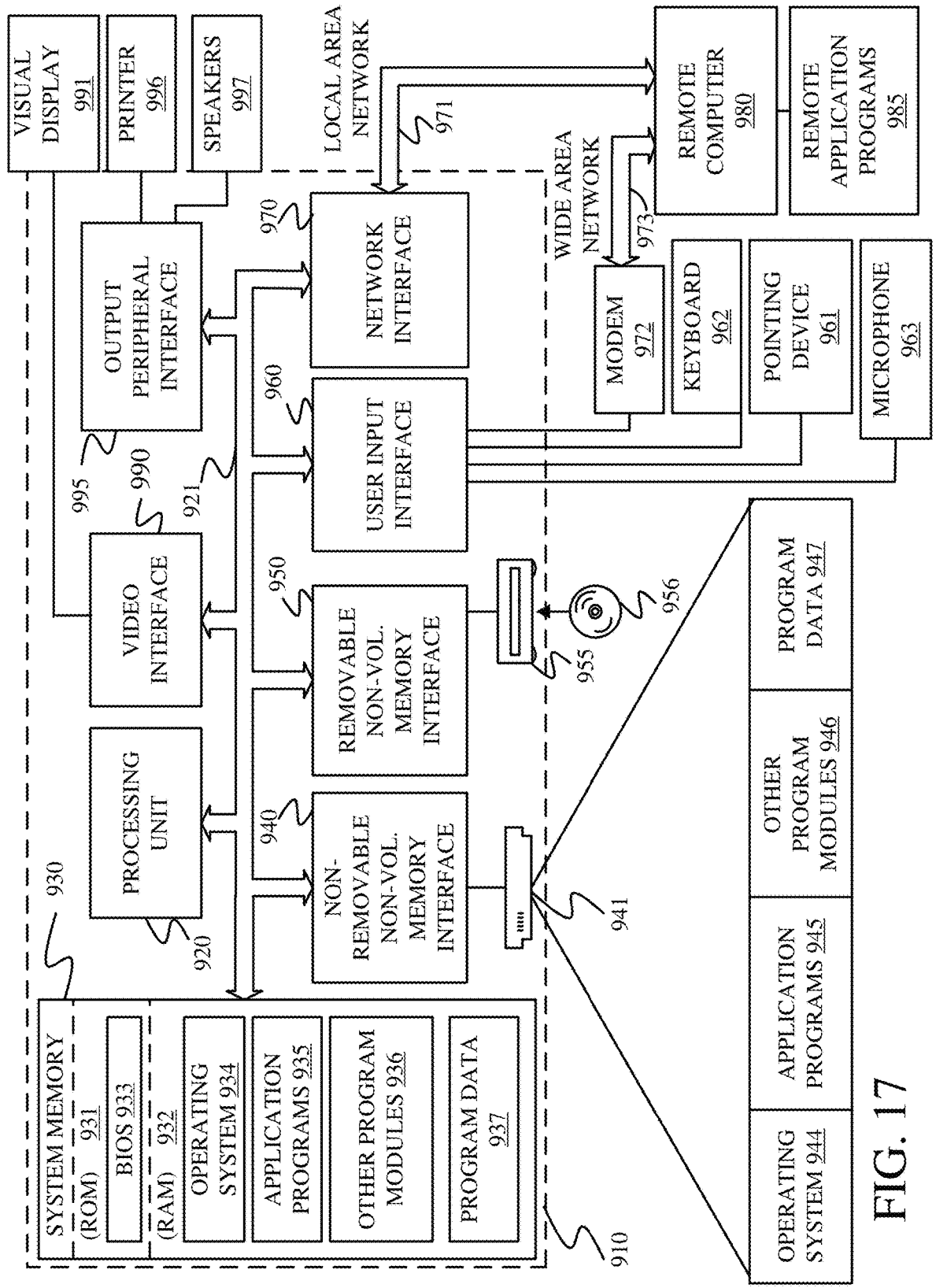
FIG. 17 is a block diagram showing one example of a computing environment that can be used in the architectures shown in the previous figures.

FIG. 17 is one example of a computing environment in which elements of FIG. 2, or parts of it, (for example) can be deployed. With reference to FIG. 17, an example system for implementing some examples includes a general-purpose computing device in the form of a computer 910. Components of computer 910 may include, but are not limited to, a processing unit 920 (which can comprise processors from pervious FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 17.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 17 illustrates operating system 934, application programs 935, other program modules 936, and program data 937.

The computer 910 may also include other removable/non-removable volatile/nonvolatile computer storage media. By way of example only, FIG. 17 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 910. In FIG. 17, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 17 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvesting machine comprising:
   a harvested crop repository;
   a crop processing system configured to engage crop in a field, perform a crop processing operation on the crop to obtain processed crop, and move the processed crop to the harvested crop repository, the crop processing system including a transfer mechanism configured to transfer the processed crop to a support machine; and
   a control system configured to:
      identify, during the crop processing operation, a geographic location of the agricultural harvesting machine in the field;
      based on the geographic location of the agricultural harvesting machine in the field during the crop processing operation, identify a turn to be performed by the agricultural harvesting machine in the field;
      determine a harvesting machine turn path for the agricultural harvesting machine to perform the turn on the field;
      generate a support machine turn path based on the harvesting machine turn path; and
      communicate an indication of the support machine turn path to a communication device associated with the support machine.

2. The agricultural harvesting machine of claim 1, wherein the control system is configured to:
   determine that the turn has a turning rate above a threshold; and
   generate the support machine turn path based on the determination.

3. The agricultural harvesting machine of claim 2, wherein the control system is configured to:
   identify a set of guidance lines representing passes on the field based on a machine path definition; and
   identify the turn between a set of the passes.

4. The agricultural harvesting machine of claim 2, wherein the control system is configured to:
   generate operational instructions for the support machine in a real-time coordination mode;
   deactivate the real-time coordination mode based on the determination that the turn has a turning rate above the threshold;
   detect completion of the turn; and
   reactivate the real-time coordination mode based on the detected completion of the turn.

5. The agricultural harvesting machine of claim 1, wherein the turn comprises a turn between successive passes over the field.

6. The agricultural harvesting machine of claim 1, wherein the support machine is configured to perform automated steering control based on the indication of the support machine turn path.

7. The agricultural harvesting machine of claim 1, wherein the control system is configured to:
operate the transfer mechanism to transfer the processed crop to the support machine during execution of the turn.

8. The agricultural harvesting machine of claim 1, wherein the control system is configured to:
identify a curvature of a portion of harvesting machine turn path;
identify a path offset; and
generate the support machine turn path that corresponds to the curvature and has a distance from the harvesting machine turn path based on the path offset.

9. The agricultural harvesting machine of claim 1, wherein the control system is configured to:
receive a sensor signal indicative of a characteristic associated with operation of the agricultural harvesting machine; and
determine a target unloading operation based on the characteristic, wherein the indication of the support machine turn path comprises an indication of the target unloading operation.

10. The agricultural harvesting machine of claim 9, wherein the characteristic comprises at least one of:
a status of a communication connection between the agricultural harvesting machine and the support machine;
an unloading status; or
a predicted crop yield.

11. A method performed by an agricultural harvesting machine, the method comprising:
controlling a crop processing system to engage crop in a field, perform a crop processing operation on the crop to obtain processed crop, and move the processed crop to a harvested crop repository;
generating one or more operational instructions for a support machine in a real-time coordination mode;
identifying a turn to be performed by the agricultural harvesting machine in the field;
determining that the turn has a turning rate above a threshold;
determining a harvesting machine turn path for the agricultural harvesting machine to perform the turn on the field;
generating a support machine turn path based on the harvesting machine turn path; and
deactivating the real-time coordination mode based on the determination that the turn has a turning rate above the threshold;
detecting completion of the turn; and
reactivating the real-time coordination mode based on the detected completion of the turn.

12. The method of claim 11, wherein the crop processing system including a transfer mechanism configured to transfer the processed crop to the support machine.

13. The method of claim 12, and further comprising:
operating the transfer mechanism to transfer the processed crop to the support machine during execution of the turn.

14. The method of claim 11, and further comprising:
identifying a path offset; and
generating the support machine turn path based on the harvesting machine turn path and the path offset.

15. The method of claim 14, and further comprising:
identifying a curvature of a portion of harvesting machine turn path; and
generating the support machine turn path that corresponds to the curvature and has a distance from the harvesting machine turn path based on the path offset.

16. A control system for an agricultural harvesting machine, the control system comprising:
at least one processor; and
memory storing instructions executable by the at least one processor, wherein the instructions, when executed, provide:
an automated machine coordination component configured to:
communicate with a support machine configured to receive harvested crop from the agricultural harvesting machine; and
send a control instruction to the support machine to coordinate operation of the support machine with the agricultural harvesting machine;
a turn automation component configured to:
receive a machine path definition;
control the agricultural harvesting machine to traverse a plurality of turns in a field based on the machine path definition; and
identify a particular turn having a turning rate above a threshold;
an unloading mode selection configured to select an unloading mode corresponding to the particular turn based on a selection criterion; and
a control signal generator configured to generate a control signal to control operation of the agricultural harvesting machine based on the selected unloading mode.

17. The control system of claim 16, wherein the selection criterion comprises one or more of:
a connection status of a communication channel between the agricultural harvesting machine and the support machine;
an unloading status of a transfer mechanism that transfers harvested crop from the agricultural harvesting machine to the support machine; and
a user preference setting indicating unloading mode prioritization.

18. The control system of claim 16, wherein the unloading mode comprises at least one of:
a stop and finish mode that prioritizes unloading prior to the particular turn;
an unloading cutoff mode that prioritizes turn traversal;
a turn sharing mode that generates and communicates an indication of a support machine turn path to the support machine; or
a delayed machine coordination that delays implementation of a real-time coordination control mode until after traversal of the particular turn.

19. The control system of claim 16, wherein the unloading mode configures the control system to:
determine a harvesting machine turn path for the agricultural harvesting machine to perform the particular turn on the field;
generate a support machine turn path based on the harvesting machine turn path; and
communicate an indication of the support machine turn path to a communication device associated with the support machine.

20. The control system of claim 16, wherein the control signal controls a communication system to send an indication of the selected unloading mode to the support machine.

* * * * *